(12) United States Patent
Chen et al.

(10) Patent No.: US 12,108,047 B2
(45) Date of Patent: Oct. 1, 2024

(54) SUB-BLOCK TEMPORAL MOTION VECTOR PREDICTION FOR VIDEO CODING

(71) Applicant: BEIJING DAJIA INTERNET INFORMATION TECHNOLOGY CO., LTD., Beijing (CN)

(72) Inventors: Yi-Wen Chen, Beijing (CN); Xiaoyu Xiu, Beijing (CN); Tsung-Chuan Ma, Beijing (CN); Hong-Jheng Jhu, Beijing (CN); Shuiming Ye, Beijing (CN); Xianglin Wang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 308 days.

(21) Appl. No.: 17/541,102

(22) Filed: Dec. 2, 2021

(65) Prior Publication Data

US 2022/0094942 A1    Mar. 24, 2022

Related U.S. Application Data

(63) Continuation of application No. PCT/US2020/036339, filed on Jun. 5, 2020.
(Continued)

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/172* (2014.11); *H04N 19/176* (2014.11)

(58) Field of Classification Search
None
See application file for complete search history.

(56) References Cited

U.S. PATENT DOCUMENTS 6,426,976 B1    7/2002   Wen et al.
2012/0128071 A1   5/2012   Celetto et al.
(Continued)

FOREIGN PATENT DOCUMENTS

CN    103004209 A    3/2013
CN    103748880 A    4/2014
(Continued)

OTHER PUBLICATIONS

Chen J et al: "Algorithm description for Versatile Video Coding and Test Model 4 (VTM 4)", Marrakech; Jan. 9, 2019-Jan. 18, 2019; (Joint Video Experts Team (JVET) of ITU-T SG 16 WP 3 and ISO/IEC JTC1/SC29/WG11), No. JVET_M1002-v2. (Year: 2019).*
(Continued)

*Primary Examiner* — James M Anderson, II
(74) *Attorney, Agent, or Firm* — Scully, Scott, Murphy & Presser, P.C.

(57)    ABSTRACT

A computing device performs a method of decoding video data by determining a co-located picture of the current coding unit; locating a spatial neighbor block of the current coding unit that corresponds to the co-located picture; determining a motion shift vector for the current coding unit from one or more motion vectors associated with the spatial neighbor block according to a predefined fixed order; and reconstructing a sub-block-based temporal motion vector for a respective sub-block of a plurality of sub-blocks in the current coding unit from a corresponding sub-block in the collocated picture based on the motion shift vector.

20 Claims, 15 Drawing Sheets

Related U.S. Application Data

(60) Provisional application No. 62/858,916, filed on Jun. 7, 2019.

(51) Int. Cl.
*H04N 19/172* (2014.01)
*H04N 19/176* (2014.01)

(56) References Cited

U.S. PATENT DOCUMENTS

| | | | |
|---|---|---|---|
| 2014/0133573 | A1 | 5/2014 | Hsu |
| 2015/0208075 | A1 | 7/2015 | Eckart et al. |
| 2018/0199057 | A1 | 7/2018 | Chuang et al. |
| 2019/0102631 | A1 | 4/2019 | Li et al. |
| 2019/0158860 | A1 | 5/2019 | Yasugi et al. |

FOREIGN PATENT DOCUMENTS

| | | | |
|---|---|---|---|
| CN | 107071481 | A | 8/2017 |
| CN | 108696754 | A | 10/2018 |
| CN | 109417630 | A | 3/2019 |
| CN | 109472308 | A | 3/2019 |
| GB | 201704139 | | 4/2017 |
| KR | 20190062273 | A | 6/2019 |
| WO | WO2016-123081 | A1 | 8/2016 |
| WO | WO2020-247761 | A1 | 12/2020 |

OTHER PUBLICATIONS

Bross et al: "Versatile Video Coding (Draft 4)", Marrakech; Jan. 9, 2019-Jan. 18, 2019; (Joint Video Experts Team (JVET) of ITU-T SG 16 WP 3 and ISO/IEC JTC1/SC29/WG11), No. JVET_M1001-v7 (Year: 2019).*

Yi-Wen Chen, CE4-related: On SbTMVP motion shift derivation, Joint Video Experts Team (JVET) of ITU-T SG 16 WP 3 and ISO/IEC JTC 1/SC 29WG 11, Document: JVET-O0588, 15th Meeting: Gothenburg, SE, Jul. 3-12, 2019, 4 pgs.

Yi-Wen Chen, CE4-related: Simplification on block location validation in SbTMVP, Joint Video Experts Team (JVET) of ITU-T SG 16 WP 3 and ISO/IEC JTC 1/SC 29/WG 11, Document; JVET-O0604, 15th Meeting: Gothenburg, SE, Jul. 3-12, 2019, 3 pgs.

Xiaoyu-Xiu, Draft text for advanced temporal motion vector prediction (ATMVP) and adaptive motion vector resolution (AMVR), Joint Video Experts Team (JVET) of ITU-T SG 16 WP 3 and ISO/IEC JTC 1/SC 29/WG 11, Document: JVET-K0566, 11th Meeting: Ljubjana, SI, Jul. 10-18, 2018, 24 pgs.

Benjamin Bross, Versatile Video Coding (Draft 4), Joint Video Experts Team (JVET) of ITU-T SG 16 WP 3 and ISO/IEC JTC 1/SC 29/WG 11, Document: JVET-M1001, 296 pgs.

Benjamin Bross, Versatile Video Coding (Draft 5), Joint Video Experts Team (JVET) of ITU-T SG 16 WP 3 and ISO/IEC JTC 1/SC 29/WG 11, Document: JVET-N1001, 29 pgs.

Beijing Dajia Internet Information Technology Co. Ltd et al., International Search Report and Written Opinion, PCT/US2020/036339, Sep. 11, 2020, 8 pgs.

Chun-Chia Chen et al., CE2.5.1: Simplification of SbTMVP, Joint Video Experts Tem (JVET) of ITU-T SG 16 WP 3 and ISO/IEC JTC I/SC 29/WG 11, [Document: JVET-M0165-V1], 13th Meeting: Marrakech, MA, pp. 1-3, Jan. 9, 2019, 3 pgs.

F. Le Leannec et al., CE4-2.2: Pairwise extension with STMVP, Joint Video Experts Team (JVET) of ITU-T SG 16WP 3 and ISO/IEC JTC 1/SC 29/WG 11, [Document: JVET-N0285], 14th Meeting: Geneva, CH, pp. 1-3, Mar. 20, 2019, 3 pgs.

Hyeongmun Jang et al., Non-CE8: modification on SbTMVP process regarding with CPR, Joint Video Experts Team (JVET) of ITU-T SG 16 WP 3 and ISO/IEC JTC 1/SC 29/WG 1, [Document : JVET-M0335], 13th Meeting: Marrakech, MA, pp. 1-3, Jan. 11, 2019, 3 pgs.

Notification of Due Registration Formalities dated Jul. 28, 2023 received in Chinese Patent Application No. CN 202310119129.3.

Notification of Due Registration Formalities dated Jan. 13, 2023 received in Chinese Patent Application No. CN 202210042724.7.

Summons to attend oral proceedings pursuant to Rule 115(1) EPC dated Oct. 4, 2023 received in European Patent Application No. EP 20818170.1.

Jianle Chen et al., Algorith description for Versatile Video Coding and Test Model 4 (VTM 4), Joint Video Experts Team (JVET) of ITU-T SG 16 WP 3 and ISO/IEC JTC 1/SC 29/WG 11, Document: JVET-M1002-v2, 13th Meeting: Marrakech, MA, Jan. 9-18, 2019, 63 pgs.

Office Action, KR10-2021-7039515, Feb. 7, 2022, 4 pgs.

Jianle Chen et al., Algorith description for Versatile Video Coding and Test Model 4 (VTM 4), Joint Video Experts Team (JVET) ofITU-T SG 16 WP 3 and ISO/IEC JTC 1/SC 29/WG 11, Document: JVET-M1002-v2, 13th Meeting: Marrakech, MA, Jan. 9-18, 2019, 63 pgs., Sep. 2, 2022.

F. Le Leannec et al., CE4-2.2: Pairwise extension with STMVP, Joint Video Experts Team (NET) ofITU-T SG 16WP 3 and ISO/IEC JTC 1/SC 29/WG 11, [Document: NET-N0285], 14th Meeting: Geneva, CH, pp. 1-3, Mar. 20, 2019, 3 pgs., Dec. 20, 2021.

* cited by examiner

SUB-BLOCK TEMPORAL MOTION VECTOR PREDICTION FOR VIDEO CODING

CROSS-REFERENCE TO RELATED APPLICATIONS

This application is a continuation of PCT application No. PCT/US2020/036339, entitled "SUB-BLOCK TEMPORAL MOTION VECTOR PREDICTION FOR VIDEO CODING" filed on Jun. 5, 2020, which claims the benefit of U.S. Provisional Application No. 62/858,916, entitled "SUB-BLOCK TEMPORAL MOTION VECTOR PREDICTION FOR VIDEO CODING" filed on Jun. 7, 2019, the entire disclosure of both of which is incorporated herein by reference.

TECHNICAL FIELD

The present application generally relates to video data encoding and decoding, and in particular, to method and system of sub-block motion vector prediction during video data encoding and decoding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the pre-defined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to system and method of sub-block motion vector prediction.

According to a first aspect of the present application, a method of decoding a current coding unit in a current picture, including: determining a co-located picture for the current picture; determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and reconstructing a sub-block-based temporal motion vector for the respective sub-block of the plurality of sub-blocks in the current coding unit from the corresponding sub-block in the co-located picture based on the motion shift vector.

According to a second aspect of the present application, a computing device includes one or more processors, memory and a plurality of programs stored in the memory. The programs, when executed by the one or more processors, cause the computing device to perform operations as described above.

According to a third aspect of the present application, a non-transitory computer readable storage medium stores a plurality of programs for execution by a computing device having one or more processors. The programs, when executed by the one or more processors, cause the computing device to perform operations as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
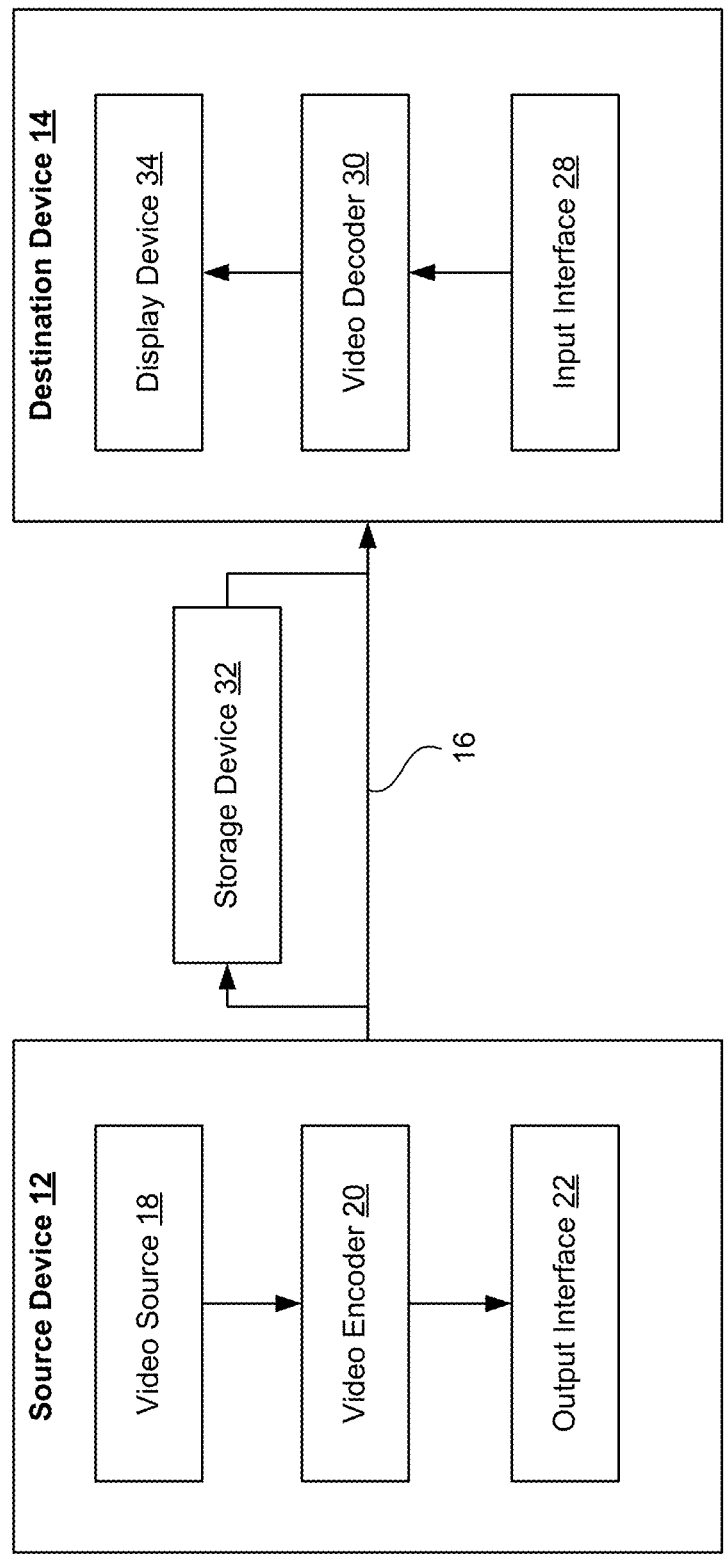
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
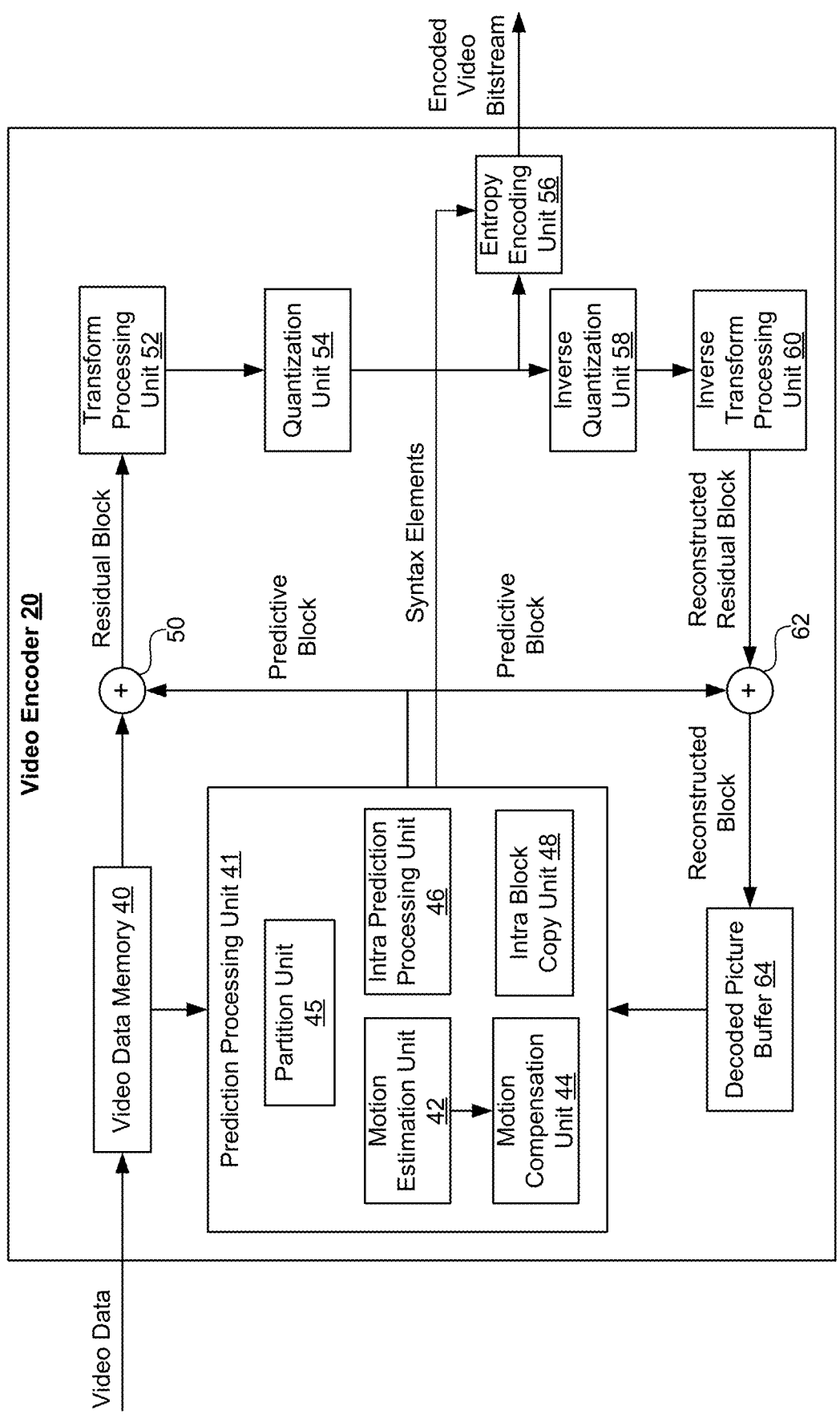
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighbor blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
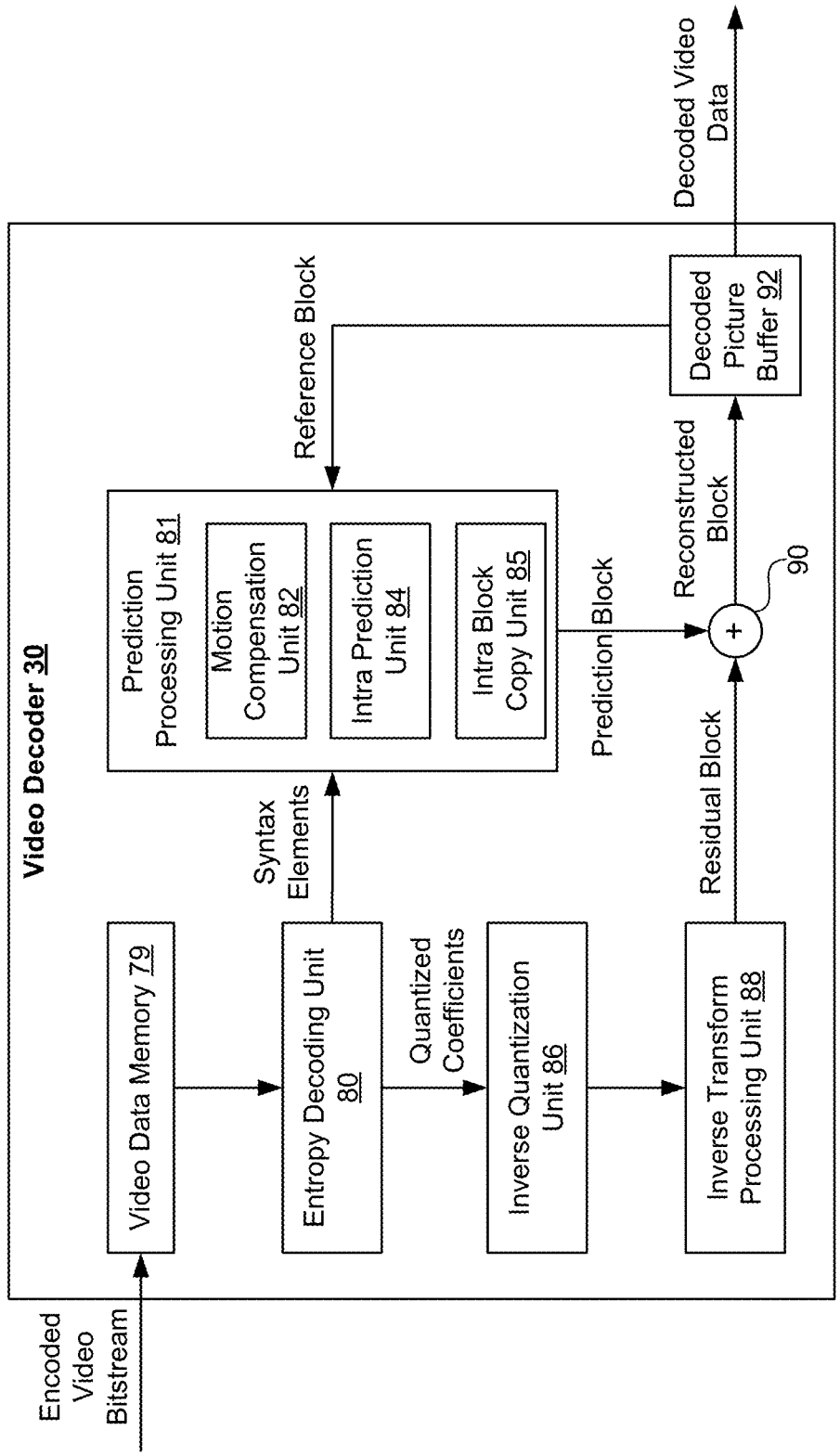
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
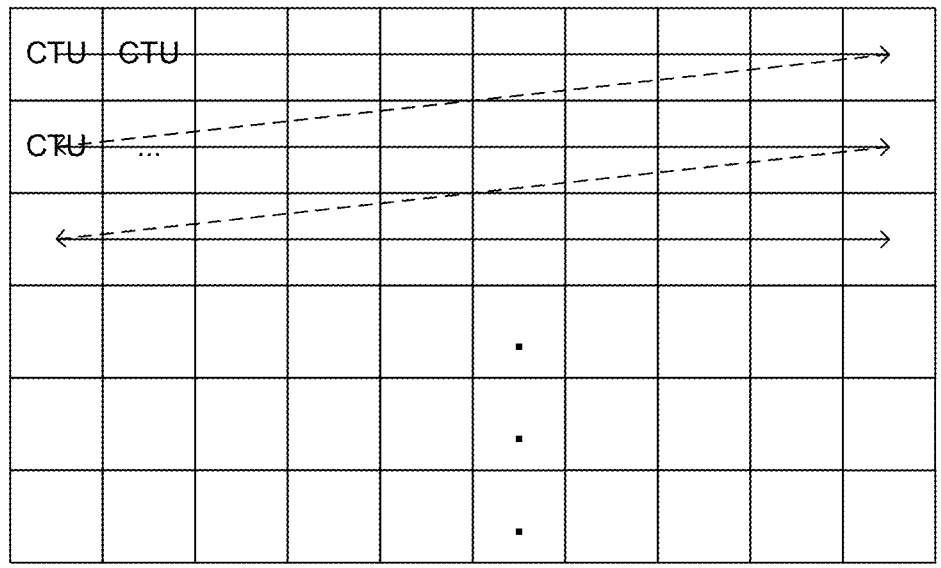
FIGS. 4A through 4E are block diagrams illustrating how a frame is recursively partitioned into multiple video blocks of different sizes and shapes in accordance with some implementations of the present disclosure.
Figure 4B:
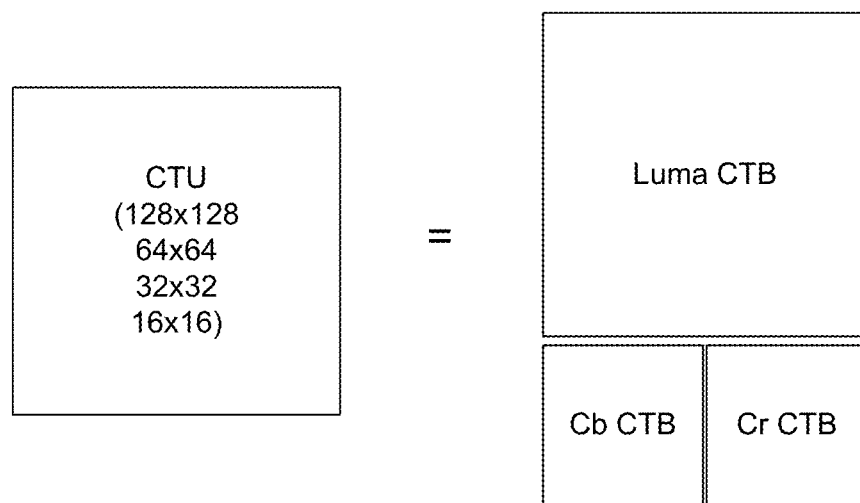

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
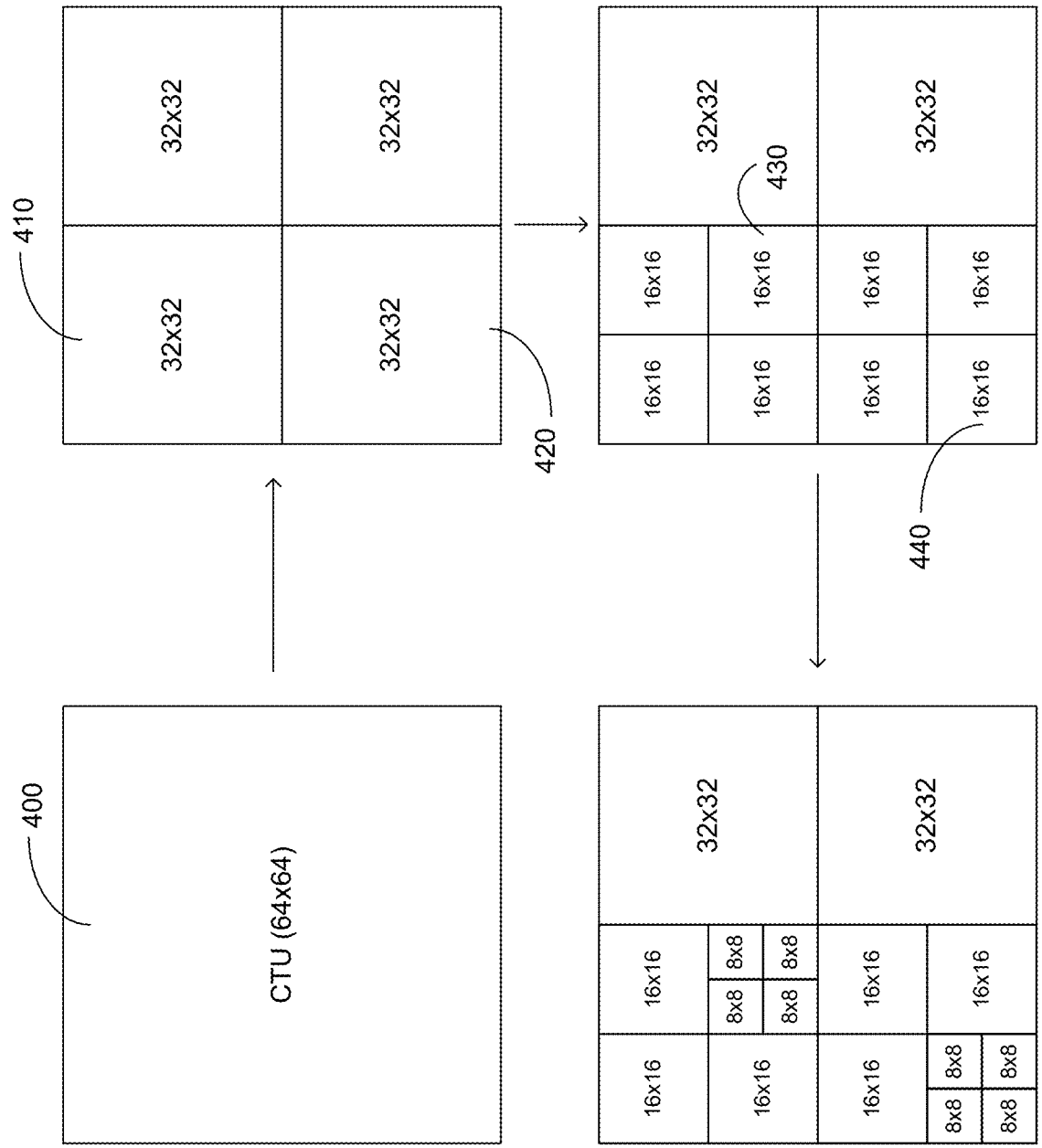
Figure 4D:
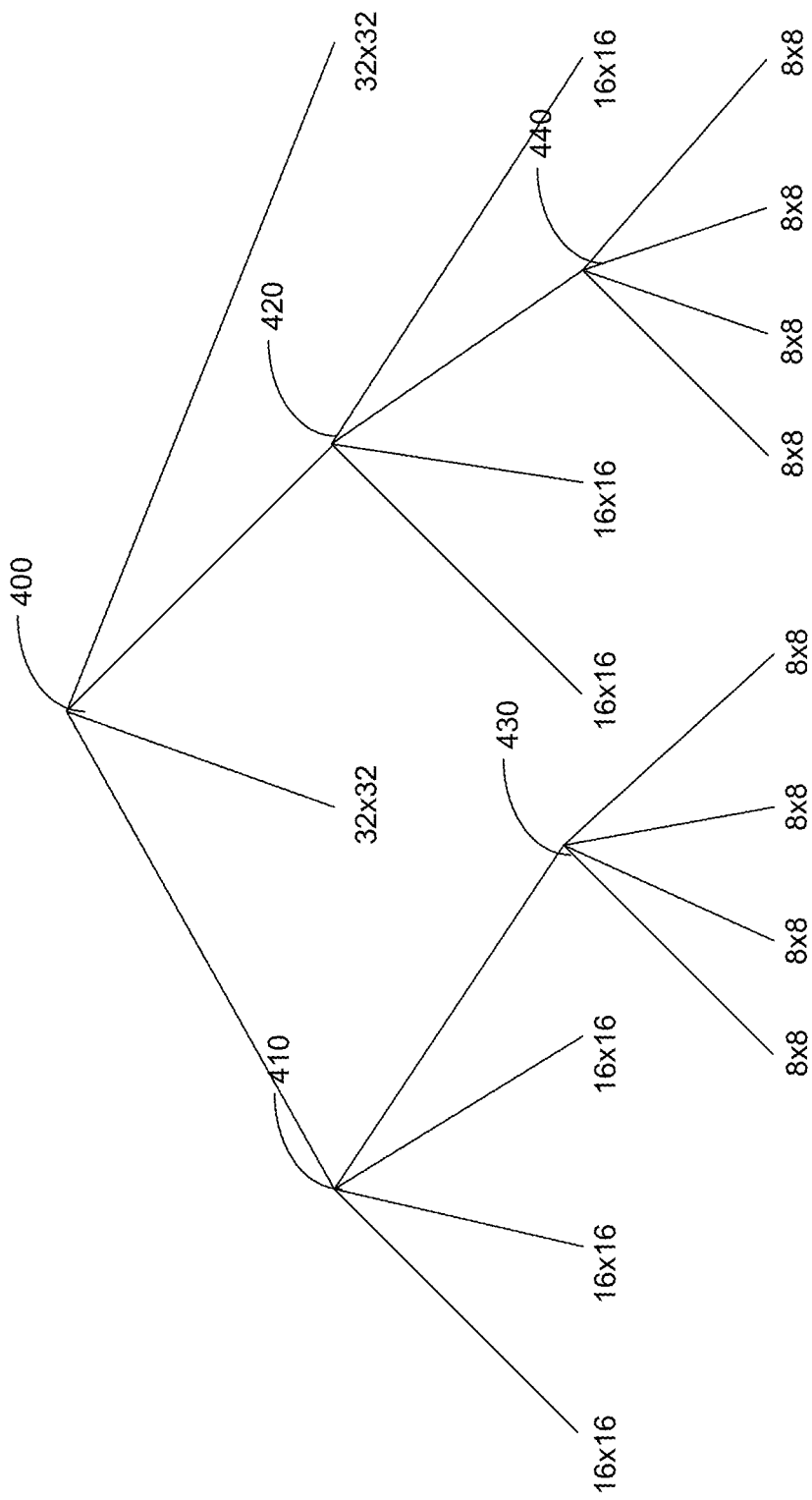
Figure 4E:
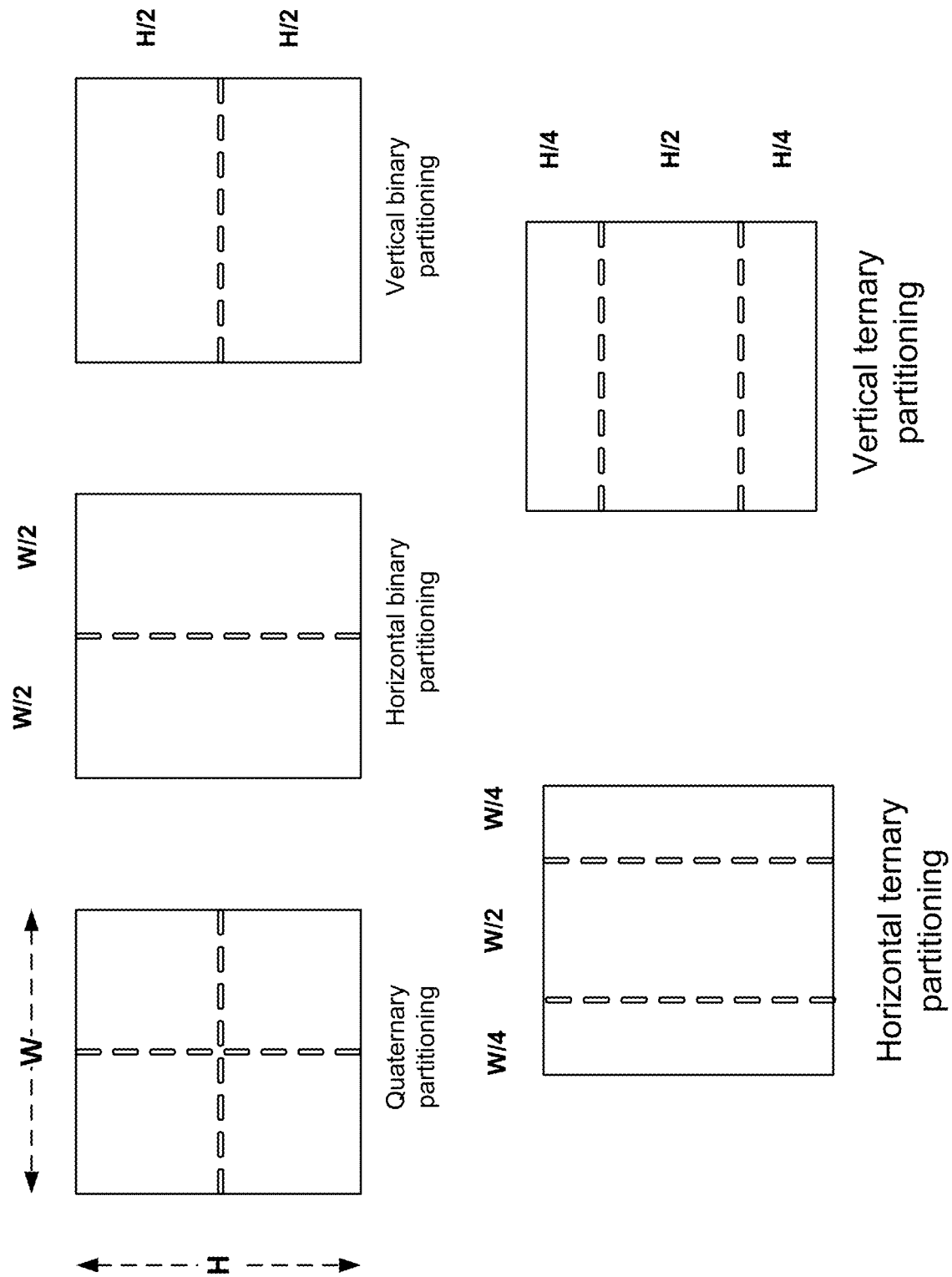

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "motion vector predictor" (MVP) of the current CU.

Instead of encoding, into the video bitstream, an actual motion vector of the current CU determined by motion estimation unit 42 as described above in connection with FIG. 2, the motion vector predictor of the current CU is subtracted from the actual motion vector of the current CU to produce a motion vector difference (MVD) for the current CU. By doing so, there is no need to encode the motion vector determined by motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both video encoder 20 and video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself between video encoder 20 and video decoder 30 and an index of the selected motion vector predictor within the motion vector candidate list is sufficient for video encoder 20 and video decoder 30 to use the same motion vector predictor within the motion vector candidate list for encoding and decoding the current CU.

In some implementations, each inter-prediction CU has three motion vector prediction modes including inter (which is also referred to as "advanced motion vector prediction" (AMVP)), skip, and merge for constructing the motion vector candidate list. Under each mode, one or more motion vector candidates may be added to the motion vector candidate list according to the algorithms described below. Ultimately one of them in the candidate list is used as the best motion vector predictor of the inter-prediction CU to be encoded into the video bitstream by video encoder 20 or decoded from the video bitstream by video decoder 30. To find the best motion vector predictor from the candidate list, a motion vector competition (MVC) scheme is introduced to select a motion vector from a given candidate set of motion vectors, i.e., the motion vector candidate list, that includes spatial and temporal motion vector candidates.

In addition to deriving motion vector predictor candidates from spatially neighboring or temporally co-located CUs, the motion vector predictor candidates can also be derived from the so-called "history-based motion vector prediction" (HMVP) table. The HMVP table houses a predefined number of motion vector predictors, each having been used for encoding/decoding a particular CU of the same row of CTUs (or sometimes the same CTU). Because of the spatial/temporal proximity of these CUs, there is a high likelihood that one of the motion vector predictors in the HMVP table may be reused for encoding/decoding different CUs within the same row of CTUs. Therefore, it is possible to achieve a higher code efficiency by including the HMVP table in the process of constructing the motion vector candidate list.

In some implementations, the HMVP table has a fixed length (e.g., 5) and is managed in a quasi-First-In-First-Out (FIFO) manner. For example, a motion vector is reconstructed for a CU when decoding one inter-coded block of the CU. The HMVP table is updated on-the-fly with the reconstructed motion vector because such motion vector could be the motion vector predictor of a subsequent CU. When updating the HMVP table, there are two scenarios: (i) the reconstructed motion vector is different from other existing motion vectors in the HMVP table or (ii) the reconstructed motion vector is the same as one of the existing motion vectors in the HMVP table. For the first scenario, the reconstructed motion vector is added to the HMVP table as the newest one if the HMVP table is not full. If the HMVP table is already full, the oldest motion vector in the HMVP table needs to be removed from the HMVP table first before the reconstructed motion vector is added as the newest one. In other words, the HMVP table in this case is similar to a FIFO buffer such that the motion information located at the head of the FIFO buffer and associated with another previously inter-coded block is shifted out of the buffer so that the reconstructed motion vector is appended to the tail of the FIFO buffer as the newest member in the HMVP table. For the second scenario, the existing motion vector in the HMVP table that is substantially identical to the reconstructed motion vector is removed from the HMVP table before the reconstructed motion vector is added to the HMVP table as the newest one. If the HMVP table is also maintained in the form of a FIFO buffer, the motion vector predictors after the identical motion vector in the HMVP table are shifted forward by one element to occupy the space left by the removed motion vector and the reconstructed motion vector is then appended to the tail of the FIFO buffer as the newest member in the HMVP table.

The motion vectors in the HMVP table could be added to the motion vector candidate lists under different prediction modes such as AMVP, merge, skip, etc. It has been found that the motion information of previously inter-coded blocks stored in the HMVP table even not adjacent to the current block can be utilized for more efficient motion vector prediction.

After one MVP candidate is selected within the given candidate set of motion vectors for a current CU, video encoder 20 may generate one or more syntax elements for the corresponding MVP candidate and encode them into the video bitstream such that video decoder 30 can retrieve the MVP candidate from the video bitstream using the syntax elements. Depending on the specific mode used for constructing the motion vectors candidate set, different modes (e.g., AMVP, merge, skip, etc.) have different sets of syntax elements. For the AMVP mode, the syntax elements include inter prediction indicators (List 0, List 1, or bi-directional prediction), reference indices, motion vector candidate indices, motion vector prediction residual signal, etc. For the skip mode and the merge mode, only merge indices are encoded into the bitstream because the current CU inherits the other syntax elements including the inter prediction indicators, reference indices, and motion vectors from a neighboring CU referred by the coded merge index. In the case of a skip coded CU, the motion vector prediction residual signal is also omitted.

Figure 5:
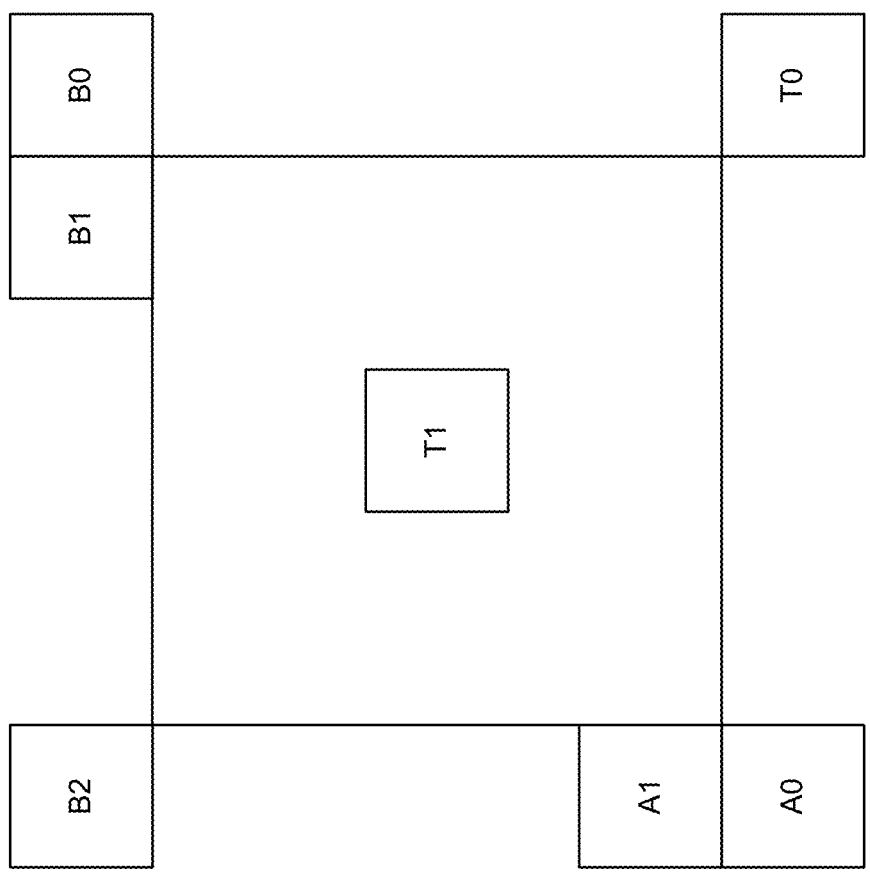
FIG. 5 is a block diagram illustrating spatially neighboring positions and temporally co-located block positions of a current CU to be encoded in accordance with some implementations of the present disclosure.

FIG. 5 is a block diagram illustrating spatially neighboring and temporally co-located block positions of a current CU to be encoded/decoded in accordance with some implementations of the present disclosure. For a given mode, a motion vector prediction (MVP) candidate list is constructed by first checking the availability of motion vectors associated with the spatially left and above neighboring block positions, and the availability of motion vectors associated with temporally co-located block positions and then the motion vectors in the HMVP table. During the process of constructing the MVP candidate list, some redundant MVP candidates are removed from the candidate list and, if necessary, zero-valued motion vector is added to make the candidate list to have a fixed length (note that different modes may have different fixed lengths). After the construction of the MVP candidate list, video encoder 20 can select the best motion vector predictor from the candidate list and encode the corresponding index indicating the chosen candidate into the video bitstream.

In some embodiments, the candidate list (also known as merge candidate list) is constructed by including the following five types of candidates in the order of:
 1. Spatial MVP (i.e. motion vector predictor) from spatially neighboring CUs
 2. Temporal MVP from co-located CUs
 3. History-based MVP from a FIFO table
 4. Pairwise average MVP
 5. Zero MVs In some embodiments, the size of the candidate list is signaled in slice header and the maximum allowed size of the candidate list is six (e.g., in VVC). For each CU code in merge mode, an index of best merge candidate is encoded using truncated unary binarization (TU). The first bin of the merge index is coded with context and bypass coding is used for other bins. In the following context of this disclosure, this extended merge mode is also called regular merge mode since its concept is the same as the merge mode used in HEVC.

Using FIG. 5 as an example and assuming that the candidate list has a fixed length of two, the motion vector predictor (MVP) candidate list for the current CU may be constructed by performing the following steps in order under the AMVP mode:

1) Selection of MVP candidates from spatially neighboring CUs
   a) Derive up to one non-scaled MVP candidate from one of the two left spatial neighbor CUs starting with A0 and ending with A1;
   b) If no non-scaled MVP candidate from left is available in the previous step, derive up to one scaled MVP candidate from one of the two left spatial neighbor CUs starting with A0 and ending with A1;
   c) Derive up to one non-scaled MVP candidate from one of the three above spatial neighbor CUs starting with B0, then B1, and ending with B2;
   d) If neither A0 nor A1 is available or if they are coded in intra modes, derive up to one scaled MVP candidate from one of the three above spatial neighbor CUs starting with B0, then B1, and ending with B2;
2) If two MVP candidates are found in the previous steps and they are identical, remove one of the two candidates from the MVP candidate list;
3) Selection of MVP candidates from temporally co-located CUs
   a) If the MVP candidate list after the previous step does not include two MVP candidates, derive up to one MVP candidate from the temporal co-located CUs (e.g., T0)
4) Selection of MVP candidates from the HMVP table
   a) If the MVP candidate list after the previous step does not include two MVP candidates, derive up to two history-based MVP from the HMVP table; and
5) If the MVP candidate list after the previous step does not include two MVP candidates, add up to two zero-valued MVPs to the MVP candidate list.

Since there are only two candidates in the AMVP-mode MVP candidate list constructed above, an associated syntax element like a binary flag is encoded into the bitstream to indicate that which of the two MVP candidates within the candidate list is used for decoding the current CU.

In some implementations, the MVP candidate list for the current CU under the skip or merge mode may be constructed by performing a similar set of steps in order like the ones above. It is noted that one special kind of merge candidate called "pair-wise merge candidate" is also included into the MVP candidate list for the skip or merge mode. The pair-wise merge candidate is generated by averaging the MVs of the two previously derived merge-mode motion vector candidates. The size of the merge MVP candidate list (e.g., from 1 to 6) is signaled in a slice header of the current CU. For each CU in the merge mode, an index of the best merge candidate is encoded using truncated unary binarization (TU). The first bin of the merge index is coded with context and bypass coding is used for other bins.

As mentioned above, the history-based MVPs can be added to either the AMVP-mode MVP candidate list or the merge MVP candidate list after the spatial MVP and temporal MVP. The motion information of a previously inter-coded CU is stored in the HMVP table and used as an MVP candidate for the current CU. The HMVP table is maintained during the encoding/decoding process. Whenever there is a non-sub-block inter-coded CU, the associated motion vector information is added to the last entry of the HMVP table as a new candidate while the motion vector information stored in the first entry of the HMVP table is removed from therein (if the HMVP table is already full and there is no identical duplicate of the associated motion vector information in the table). Alternatively, the identical duplicate of the associated motion vector information is removed from the table before the associated motion vector information is added to the last entry of the HMVP table.

As noted above, intra block copy (IBC) can significantly improve the coding efficiency of screen content materials. Since IBC mode is implemented as a block-level coding mode, block matching (BM) is performed at video encoder 20 to find an optimal block vector for each CU. Here, a block vector is used to indicate the displacement from the current block to a reference block, which has already been reconstructed within the current picture. An IBC mode is treated as the third prediction mode other than the intra or inter prediction modes.

At the CU level, the IBC mode can be signaled as IBC AMVP mode or IBC skip/merge mode as follows:

IBC AMVP mode: a block vector difference (BVD) between the actual block vector of a CU and a block vector predictor of the CU selected from block vector candidates of the CU is encoded in the same way as a motion vector difference is encoded under the AMVP mode described above. The block vector prediction method uses two block vector candidates as predictors, one from left neighbor and the other one from above neighbor (if IBC coded). When either neighbor is not available, a default block vector will be used as a block vector predictor. A binary flag is signaled to indicate the block vector predictor index. The IBC AMVP candidate list consists of spatial and HMVP candidates.

IBC skip/merge mode: a merge candidate index is used to indicate which of the block vector candidates in the merge candidate list (also known as a "merge list" or "candidate list") from neighboring IBC coded blocks is used to predict the block vector for the current block. The IBC merge candidate list consists of spatial, HMVP, and pairwise candidates.

FIGS. 6A-6D are block diagrams illustrating steps for deriving temporal motion vector predictors (TMVPs) of a current block or sub-block temporal motion vector predictors (SbTMVPS) of a sub-block in accordance with some implementations of the present disclosure.

In some embodiments, only one temporal motion vector predictor (TMVP) candidate is added to the merge candidate list as described with respect to FIG. 5. A first flag (sps_temporal_mvp_enabled_flag) is signaled in the sequence parameter set (SPS) of the picture and a second flag (slice_temporal_mvp_enabled_flag) is signaled in the slice header to indicate whether this TMVP candidate is enabled or disabled. Particularly, in the derivation of this temporal merge candidate, a scaled motion vector is derived from MVs of the co-located picture, which is a previously coded picture in a reference picture list. In the derivation of the temporal motion candidate, an explicit flag in slice header (co-located_from_l0_flag) is firstly sent to the decoder to indicate whether the co-located picture is selected from the first reference frame list (List 0) or the second reference frame list (List 1). A co-located reference index (co-located_ref_idx) is further sent to indicate which picture in the used list is selected as the co-located picture for deriving the temporal motion candidate. The List 0 (also known as L0) and List 1 (also known as L1) MVs of the temporal motion candidate is derived independently according to a predefined order for the MVs of different lists in the co-located blocks of the co-located pictures according to the pseudocode below:

TABLE 1

Pseudocode for deriving temporal MV from the co-located block for TMVP

When deriving the LX MV (X could be 0 or 1) of the temporal motion candidate, the LY MV (Y could be 0 or 1) of the co-located block is selected to derive the LX MV of the temporal motion candidate for the current block. The selected LY MV of the co-located block is then scaled according to the POC distances as described in the following paragraph.
If current picture has no backward prediction (which means there are no reference pictures have larger POC then current picture)
    LX MV of the co-located block is first selected. If the LX MV is not available, the L(1-X) is then selected.
Otherwise (current picture has backward prediction)
    LN MV of the co-located block is first selected. The N is set to the 1-co-located picture list (0 or 1).
        If the LN MV is not available, the L(1-N) is then selected.

Figure 6A:
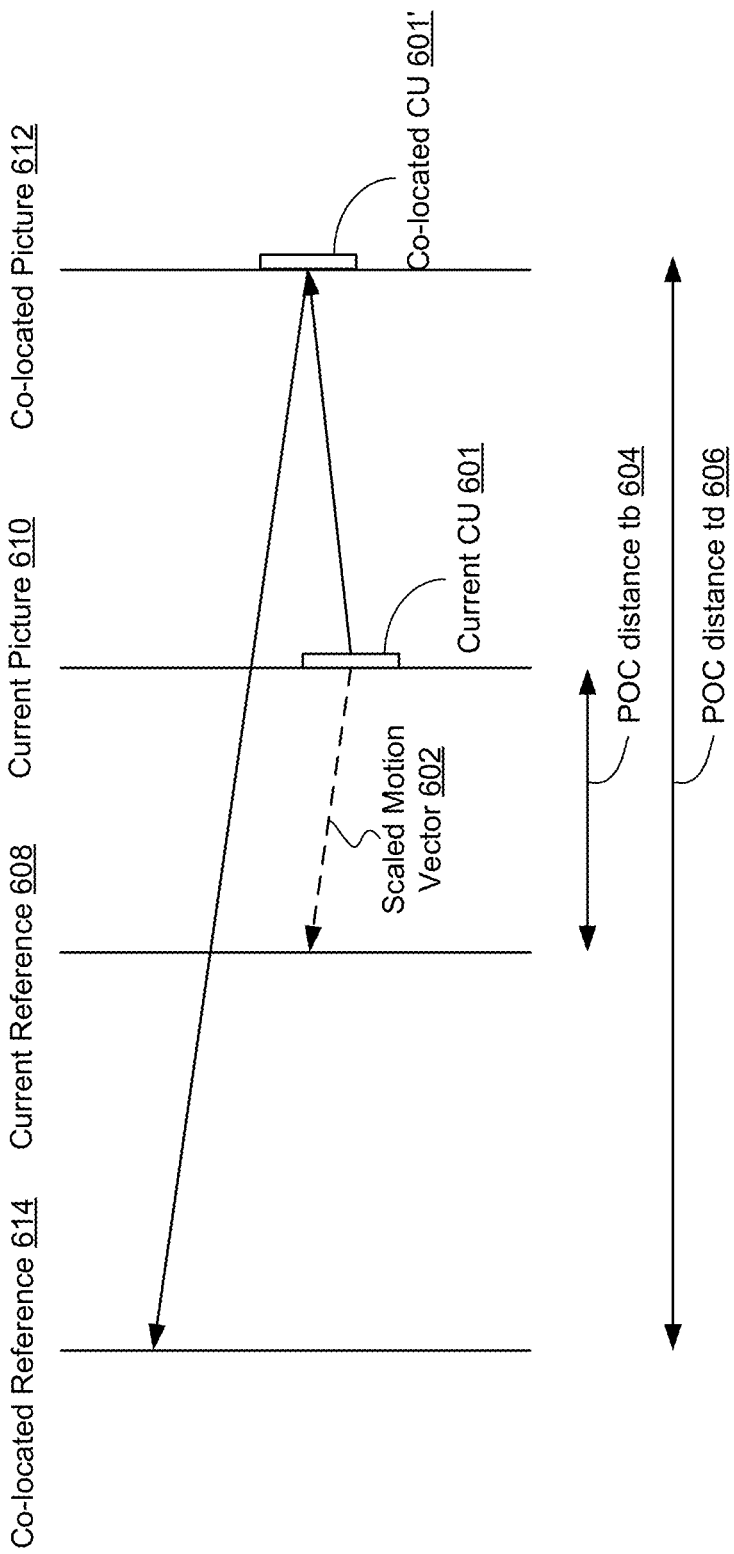
FIGS. 6A-6D are block diagrams illustrating steps for deriving temporal motion vector predictors of a current block or sub-block temporal motion vector predictors of a sub-block in the current block in accordance with some implementations of the present disclosure.

The scaled motion vector 602 for temporal merge candidate is obtained as illustrated by the dotted line in FIG. 6A, which is scaled from the selected motion vector of the co-located block using the POC distance tb 604 and POC distance td 606, where tb is defined to be the POC difference between the reference picture of the current picture (e.g., current reference 608) and the current picture (e.g., current picture 610) and td is defined to be the POC difference between the reference picture of the co-located picture (co-located reference 614) and the co-located picture (co-located picture 612). The reference picture index of the temporal merge candidate is set equal to zero. A practical realization of the scaling process is described in the HEVC specification. For a B-slice, two motion vectors, one is for reference picture List 0 and the other is for reference picture List 1, are obtained and combined to make the bi-predictive merge candidate.

Figure 6B:
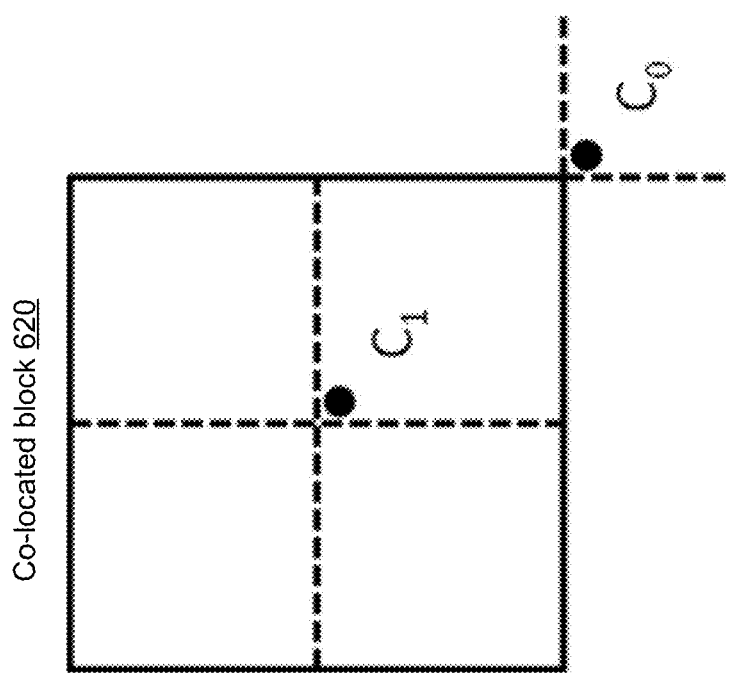

In the co-located block (e.g., co-located block 620) belonging to the reference frame, the position for the temporal candidate is selected between candidates $C_0$ and $C_1$, as depicted in FIG. 6B. If block at position $C_0$ is not available, is intra coded, or is outside of the current CTU, position $C_1$ is used. Otherwise, position $C_0$ is used in the derivation of the temporal merge candidate.

Some coding standards (e.g., VVC Test Model 1) support sub-block-based temporal motion vector prediction (SbTMVP) method. Similar to the temporal motion vector prediction (TMVP) in HEVC, SbTMVP uses the motion field in the co-located picture to improve motion vector prediction and merge mode for CUs in the current picture. The same co-located picture used by TMVP is used for SbTMVP. SbTMVP differs from TMVP in the following two main aspects:
1. TMVP predicts motion at CU level but SbTMVP predicts motion at sub-CU level;
2. While TMVP selects the temporal motion vectors from the co-located block in the co-located picture (the co-located block is the bottom-right or center block relative to the current CU), SbTMVP applies a motion shift to the temporal motion information selected from the co-located picture, where the motion shift is obtained from the motion vector from one of the spatial neighboring blocks of the current CU.

Figure 6C:
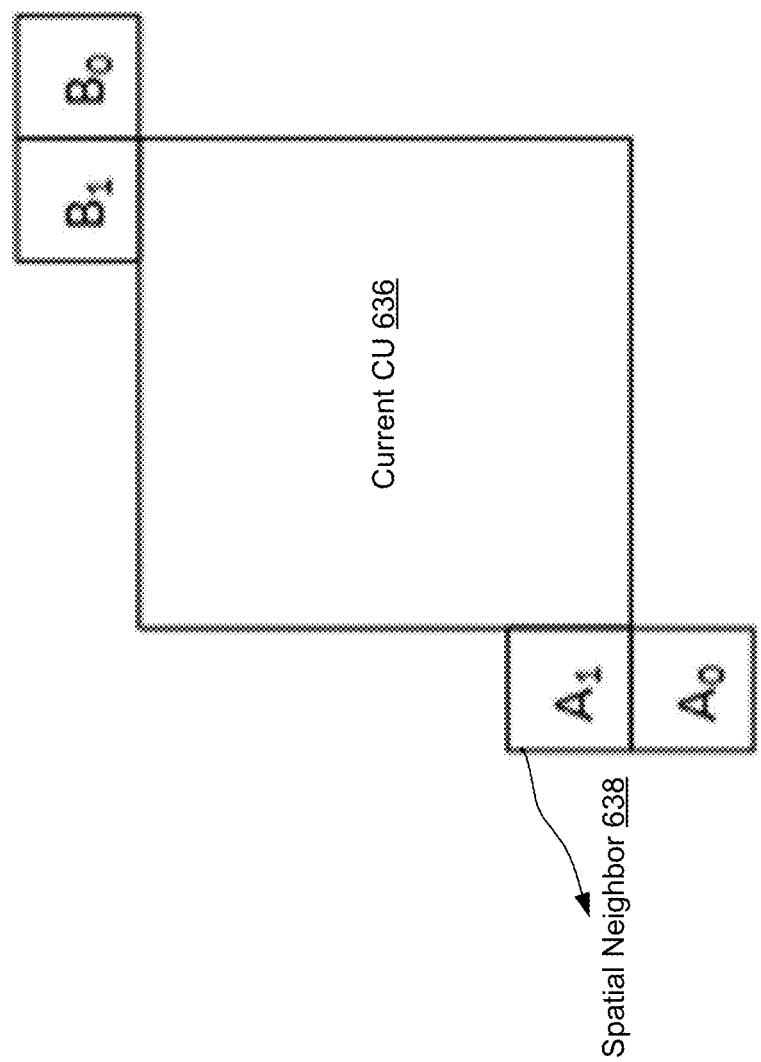
Figure 6D:
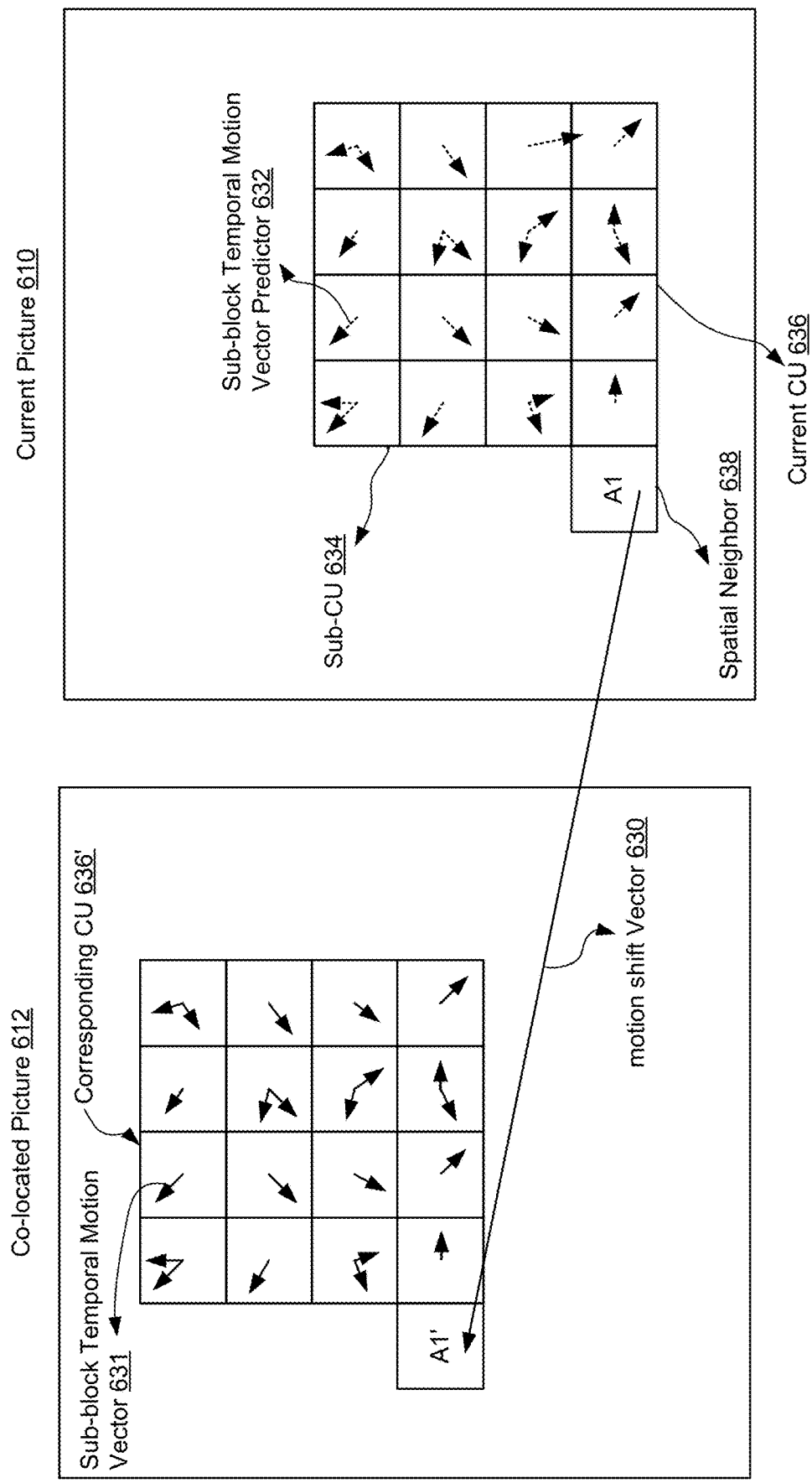

The SbTMVP process is illustrated in FIGS. 6C-6D. SbTMVP (SbTMVP 632 of FIG. 6D) predicts the motion vectors of the sub-CUs (e.g., sub-CU 634) within the current CU (current CU 636 of FIG. 6D) in two steps. In the first step, the spatial neighbor A1 (e.g., spatial neighbor 638) in FIG. 6C is examined. If A1 has a motion vector that uses the co-located picture (e.g., co-located picture 612 of FIG. 6A) as its reference picture, this motion vector is selected to be the motion shift to be applied (e.g., motion shift 630 of FIG. 6D). If no such motion vector is identified, then the motion shift is set to zero-value vector (0, 0). The first available motion vector among the List 0 and List 1 MVs of block A1 is set to be the motion shift. This way, in SbTMVP, the corresponding block may be more accurately identified, compared with TMVP, wherein the corresponding block (sometimes called co-located block) is always in a bottom-right or center position relative to the current CU. The pseudocode for determining the motion shift is below.

Pseudocode for determining the motion
shift for the SbTMVP in VVC

```
bool terminate = false;
motion shift = 0;
for (currRefListId = 0; currRefListId < (CurrentSliceType == B_SLICE ?
2 : 1) && !terminate; currRefListId++)
    {
        currRefPicList = RefPicList(LDC ? (ColFromL0Flag ?
currRefListId : 1 − currRefListId) : currRefListId);
        if ((interDirA1 & (1 << currRefPicList)) &&
getRefPic(currRefPicList, refIdxA1[currRefListId]) == ColPic)
        {
            motion shift = mvA1[currRefListId];
            terminate = true;
            break;
        }
    }
```

The variables and functions used in the table above are illustrated as follows.
    CoFromL0Flag: the syntax to indicate whether the co-located picture is from the List 0 reference picture list
    LDC: to indicate whether all reference pictures have smaller POC values than the current picture
    CurrentSliceType: the type of current slice (picture)
    count: the available number of already derived merging candidates
    interDirA1: the interDir (1:L0, 2:L1 or 3:Bi) of the Nth merging candidate
    refIdxA1[0]: the L0 motion information (e.g. MV, ref. index) of the Nth merging candidate refIdxA1[1]: the L1 motion information (e.g. MV, ref. index) of the Nth merging candidate getRefPic(M,I): a function for getting a reference picture from the reference picture List M with a reference index equal to I.

In the second step, the motion shift identified in Step 1 is applied (i.e. added to the current block's coordinates) to obtain sub-CU-level motion information (motion vectors and reference indices) from the co-located picture as shown in FIG. 6D. The example in FIG. 6D assumes the motion shift is set to block A1's motion. In actual implementation, the motion shift may be set to any of the blocks A1, A2, B1, or B2's motion.

First, a representative sub-CU is selected and the motion information of the corresponding block of this representative sub-CU is used as default motion information. In the existing scheme of SbTMVP, the sub-CU located at the bottom-right of the center position of current CU is selected as the representative sub-CU. When no valid motion information could be derived as the default motion information from the corresponding block of the representative sub-CU, the SbTMVP candidate is regarded as not available. When default motion information is available, it goes to the next step to derive the motion information for each sub-CU within the current CU. Whenever no motion information is available for the corresponding block of any sub-CU, the default motion information will be used as its derived temporal motion for that sub-CU.

Then, for each sub-CU, the motion information of its corresponding block (the smallest motion grid that covers the center sample) in the co-located picture is used to derive the motion information for the sub-CU. After the motion information of the co-located sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

Figure 7:
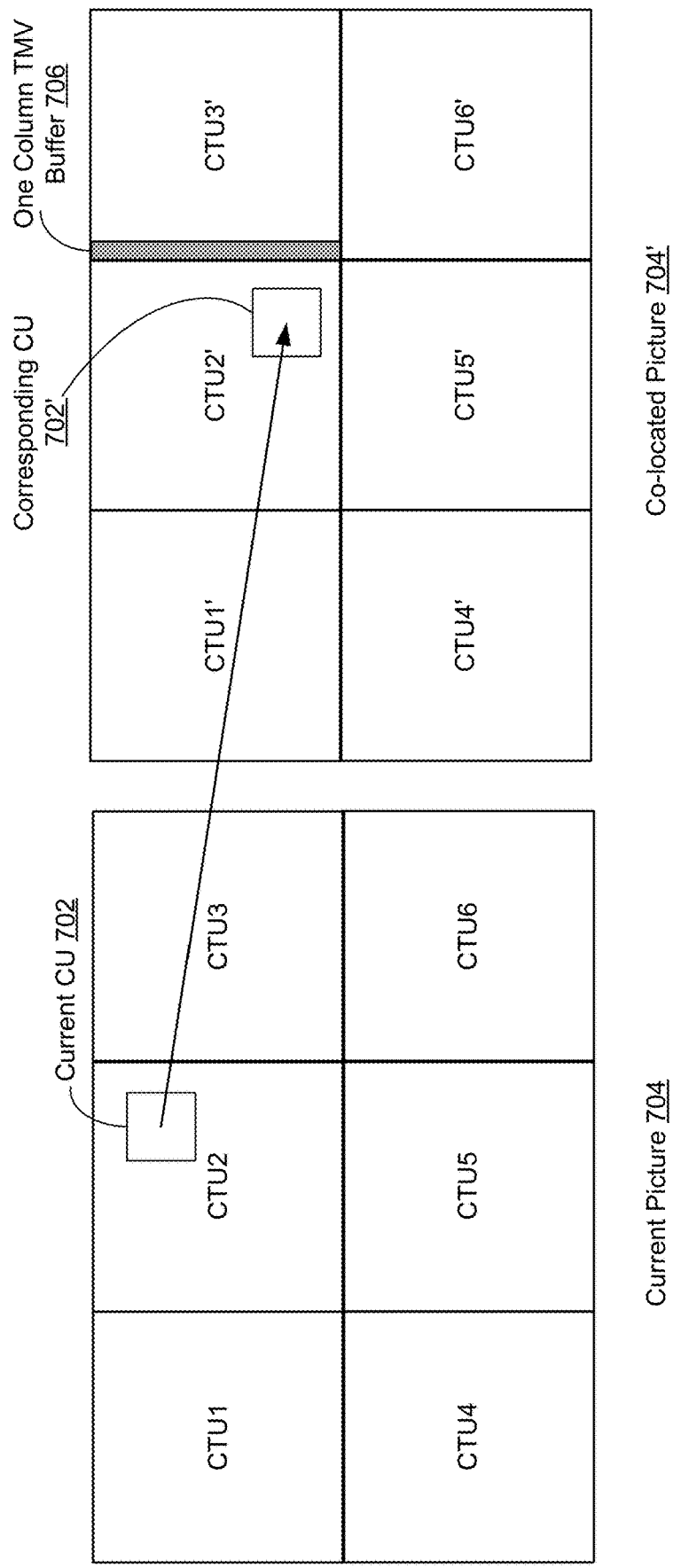
FIG. 7 illustrates a block diagram for determining a valid area for deriving a temporal motion vector predictors and sub-block temporal motion vector predictors in accordance with some implementations of the present disclosure.

It is noted that, in the current design, only the motion field within a co-located CTU plus one column on the right side of the co-located CTU in the co-located picture could be used for SbTMVP and TMVP derivation for each CU. As shown in FIG. 7, only the motion information within the co-located CTU plus one column of motion information on the right of the co-located CTU (the CTU2 is the co-located CTU of the current CU in this example) could be used for the temporal mv derivation for SbTMVP and TMVP. Hereafter, for the convenience of illustration, we would call this co-located CTU plus one column as "valid area" for SbTMVP/TMVP derivation. Under this context, whenever a corresponding N×N block in the co-located picture of a sub-CU is located outside the valid area, the corresponding N×N block is replaced with an alternative one located within the co-located CTU. The position of the alternative N×N block is derived by clipping the original position of the corresponding N×N block to be located within the valid area using the below equation. In the below equation (position clipping process for each sub-CU), CurPicWidthIn-SamplesY and CurPicHeightInSamplesY are the width and height of the coded picture, CTUWidthInSamplesX and CTUWidthInSamplesY are the width and height of the CTU, xCtb and yCtb are the horizontal and vertical position of the top-left sample of the co-located CTU. xColCtrCb and yColCtrCb are the horizontal and vertical position of the representative sample of the sub-CU, MotionShiftX and MotionShiftY are the x and y components of the motion shift, respectively. The function Clip3(x,y,z) and Min(x,y) are defined as below.

$$Clip3(x, y, z) = \begin{cases} x & ; \quad z < x \\ y & ; \quad z > y \\ z & ; \quad \text{otherwise} \end{cases} \quad Min(x, y) = \begin{cases} x & ; \quad x <= y \\ y & ; \quad x > y \end{cases}$$

The location ( xColCb, yColCb ) of the co-located block inside the co-located picture is derived as follows.
xColCb = Clip3( xCtb, Min( CurPicWidthInSamplesY − 1, xCtb + CTUWidthInSamplesY + 3 ),
xColCtrCb + MotionShiftX ) )
yColCb = Clip3( yCtb, Min( CurPicHeightInSamplesY − 1, yCtb + CTUHeightInSamplesY − 1 ),
yColCtrCb + MotionShiftY )

In VVC, a combined sub-block based merge list which contains both SbTMVP candidate and affine merge candidates is used for the signaling of sub-block based merge mode. The SbTMVP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of the sub-block based merge list is signaled in SPS and the maximum allowed size of the sub-block based merge list is 5 in VVC.

The sub-CU size used in SbTMVP is fixed to be 8×8, and as done for affine merge mode, SbTMVP mode is only applicable to the CU with both width and height are larger than or equal to 8. Moreover, in current VVC, for temporal motion field storage used by TMVP and SbTMVP, motion field compression is performed at 8×8 granularity in contrast to the 16×16 granularity in HEVC.

In some embodiments, the motion shift is always derived from the List 0 mv of the neighboring block; if the List 0 mv is not available, the List 1 mv of the neighboring block is then used to derive the motion shift for SbTMVP. The pseudocode is described below:

Pseudocode for determining the motion shift for SbTMVP

```
bool terminate = false;
for (currRefListId = 0; currRefListId < (CurrentSliceType == B_SLICE ?
2 : 1) && !terminate; currRefListId++)
    {currRefPicList = currRefListId;
        if ((interDirA1 & (1 << currRefPicList)) &&
getRefPic(currRefPicList, refIdxA1[currRefListId]) == ColPic)
        {
            motion shift = mvA1[currRefListId];
            terminate = true;
            break;
        }
    }
```

In some embodiments, the motion shift is always derived from the List 1 mv of the neighboring block; if the List 1 mv is not available, the List 0 mv of the neighboring block is then used to derive the motion shift for SbTMVP. The pseudocode is described below:

---
Pseudocode for determining the motion shift for SbTMVP

```
bool terminate = false;
for (currRefListId = 0; currRefListId < (CurrentSliceType == B_SLICE ?
2 : 1) && !terminate; currRefListId++)
    {currRefPicList = 1−currRefListId;
        if ((interDirA1 & (1 << currRefPicList)) &&
getRefPic(currRefPicList, refIdxA1[currRefListId]) == ColPic)
        {
            motion shift = mvA1[currRefListId];
            terminate = true;
            break;
        }
    }
```
---

In some embodiments, whenever there is any corresponding block of a sub-CU located outside the valid area, the zero vector is used as the motion shift vector to derive the SbTMVP. By doing so, the corresponding blocks of all the sub-CUs of current CU are guaranteed to be located within the valid area. Therefore, no position clipping process is required for each sub-CU. There are many ways to determine whether there is any corresponding block of a sub-CU in current CU is located outside the valid area. In one example, the corresponding block of the top-left N×N sub-CU and the corresponding block of the bottom-right N×N sub-CU are checked to see whether the two corresponding blocks are within the valid area. If either one is located outside the valid area, zero vector is used as the motion shift vector; otherwise (both corresponding blocks are located within the valid area), the derived motion shift is used for SbTMVP.

In some embodiments, whenever there is any corresponding block of a sub-CU located outside the valid area, the SbTMVP is regarded as not available for the current CU.

In some embodiments, whenever there is any corresponding block of a sub-CU located outside the valid area, the motion shift is modified to guarantee that the corresponding blocks of all the sub-CUs are located within the valid area. Therefore, no position clipping process is required for each sub-CU.

In some embodiments, zero vector is always used the motion shift for the SbTMVP derivation.

In some embodiments, it is proposed to use the default MV derived from the representative sub-CU as the MV of the sub-CU having a corresponding block located outside the valid area.

FIG. 7 illustrates a block diagram for determining the valid area for deriving the TMVP and SbTMVP for a coding block (e.g., current CU 702) in a current picture (e.g., current picture 704) in accordance with some implementations of the present disclosure. The valid area is an area in the co-located picture (e.g., co-located picture 704') in which a corresponding CU (e.g., corresponding CU 702') to a current CU (e.g., current CU 702) is being searched for the TMVP or SbTMVP. In some implementations, the valid area is determined by the CTU (e.g., CTU2') plus one column (e.g., one column TMV buffer 706) for deriving the TMVP and SbTMVP. The valid area constraint is a design for memory usage reduction. By constraining the valid area as the co-located CTU plus one column, only the motion information within the valid area needs to be stored in the internal memory (e.g. cache) to reduce the average cost (time or energy) of accessing the temporal motion data from the outside memory. Currently, the maximum CTU size is 128×128 in VVC (the maximum CTU size may be determined in the later stage for VVC profiles), and the CTU size could be set as less than 128×128 (e.g. 64×64 or 32×32). In one example when the CTU size is set to 64×64, the valid area is constrained as the co-located 64×64 block plus one column. Since the design of the temporal MV buffer for the maximum CTU is already there, it may be unwise to use a valid area smaller than the size of maximum CTU from the coding efficiency perspective. In some embodiments, the valid area is always fixed as the allowable maximum CTU size plus one column no matter what CTU size is in use.

In some embodiments, the valid area is modified to be just the co-located CTU.

In some embodiments, the valid area is the co-located CTU plus one column when the CTU size is equal to the maximum CTU size. When the CTU size is smaller than the maximum CTU size, the valid area is modified to be the co-located CTU plus one column on the right of the co-located CTU and one row below the co-located CTU.

Figure 8A:
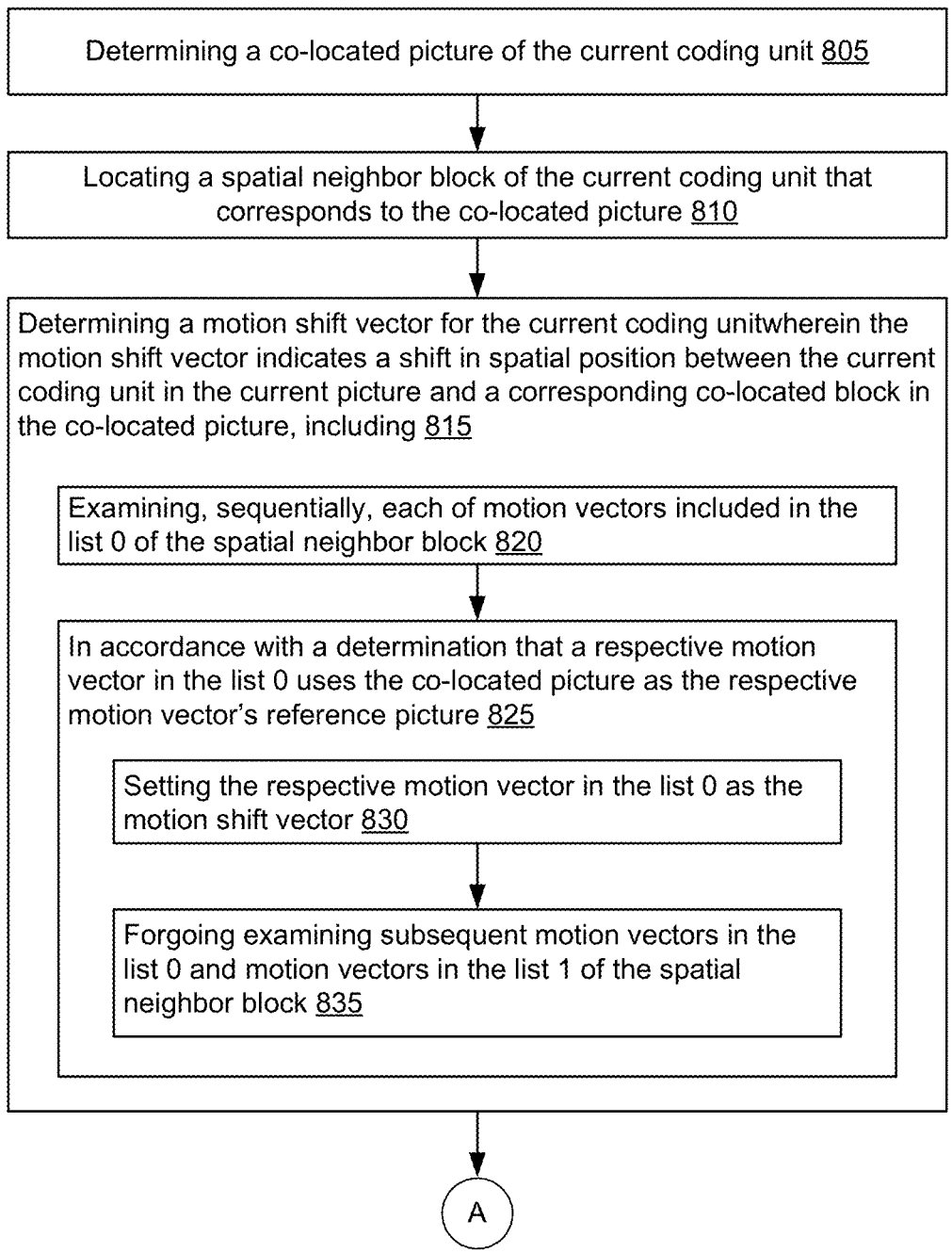
FIGS. 8A-8B illustrate a flowchart illustrating an exemplary process by which a video coder implements the techniques of deriving sub-block temporal motion vector predictors in accordance with some implementations of the present disclosure.
Figure 8B:
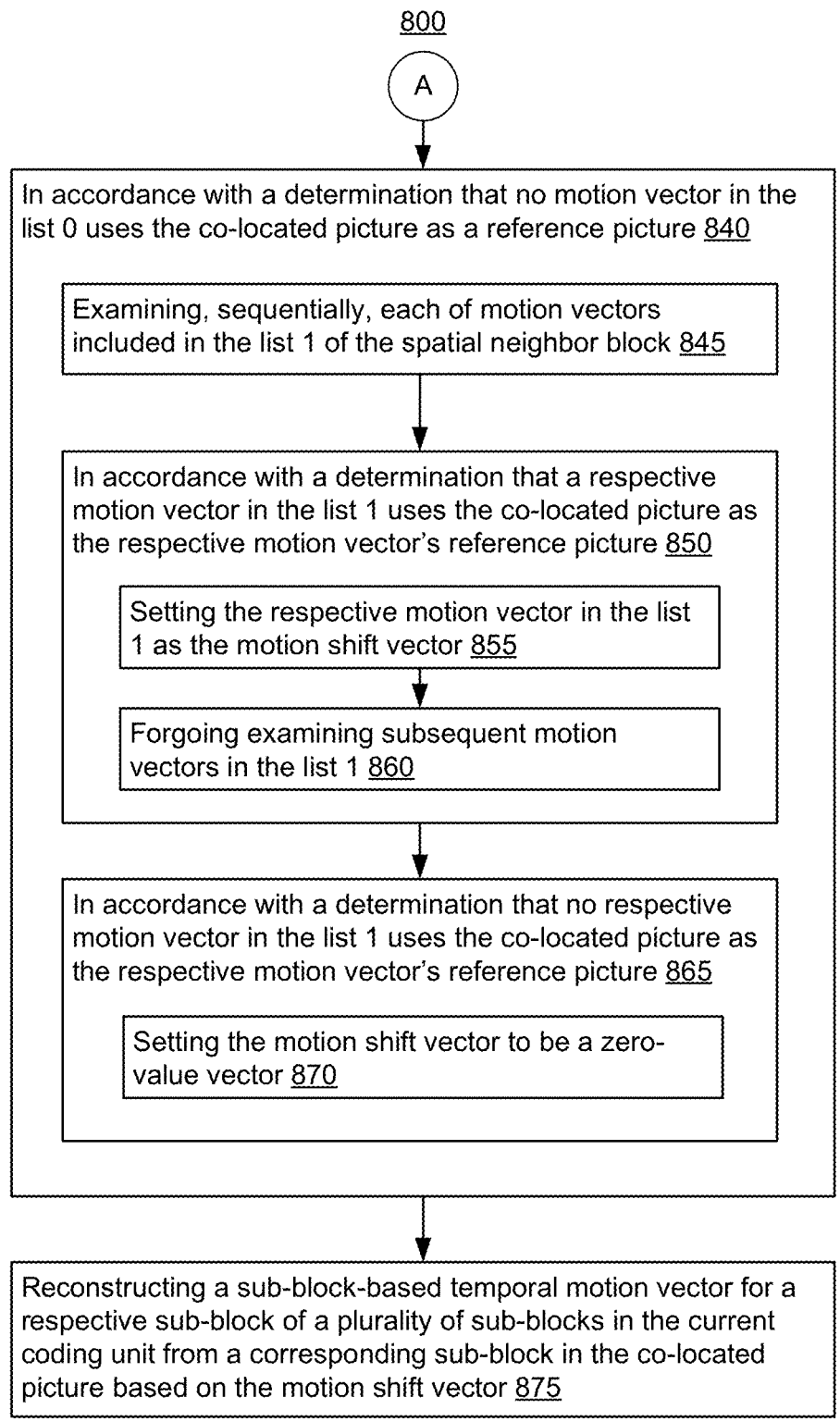

FIGS. 8A-8B illustrate a flowchart illustrating an exemplary process 800 by which a video coder implements the techniques of deriving sub-block temporal motion vector predictors in accordance with some implementations of the present disclosure. Although process 800 can be a decoding or an encoding process, for convenience, process 800 will be described as a decoding process, performed by a video decoder (e.g., the video decoder 30 of FIG. 3).

As the first step, the decoder determines a co-located picture of the current coding unit (805) (e.g., receiving a first syntax element from the bitstream that indicates whether a co-located picture of the current frame is from a first list or a second list; then receiving a second syntax element from the bitstream which indicates which frame of the selected list is used as the co-located frame). For example, refer to FIG. 6A, the current CU 601 in the current picture 610 corresponds to a co-located Cu 601' in co-located picture 612.

Next, the decoder locates a spatial neighbor block of the current coding unit (810). For example, refer to FIG. 6D, the current coding unit (e.g., current CU 636) has spatial neighbor 638 (block A1). In some embodiments, the spatial neighbor block is a coding unit or a sub-block.

After locating the spatial neighbor block, the decoder then determines a motion shift vector for the current coding unit (815). The motion shift vector indicates a shift in spatial position between the current coding unit (e.g., current CU 636 in FIG. 6D) in the current picture (e.g., current picture 610 in FIG. 6D) and a corresponding co-located block (e.g., spatial neighbor 638' (block A1') in FIG. 6D) in the co-located picture (e.g., co-located picture 612 in FIG. 6D).

To determine the motion shift vector, the decoder sequentially examines each of the motion vectors included in the List 0 of the spatial neighbor block (820). In accordance with a determining that a respective motion vector in the List 0 uses the co-located picture as the respective motion vector's reference picture (825): the decoder sets the respective motion vector in the List 0 as the motion shift vector (830) (e.g., motion shift vector 630), and forgoes examining subsequent motion vectors in the List 0 and motion vectors in the List 1 of the spatial neighbor block (835). As a result, the search for motion vector concludes and the first matching motion vector in the List 0 will be used as the motion shift vector. In other words, the decoder always first checks the motion vectors included in the List 0 of the spatial neighbor block before checking the List 1.

On the other hand, in accordance with a determination that no respective motion vector in the List 0 uses the co-located picture as the reference picture (840), the decoder sequentially examines each of the motion vectors included in the List 1 of the spatial neighbor block (845). That is to say, the decoder only checks the List 1 of the spatial neighbor block of motion vectors if and only if the search of motion vectors in the List 0 returns negative results.

While searching for motion vectors in the List 1 of the spatial neighbor block, in accordance with a determination that a respective motion vector in the List 1 uses the co-located picture as the respective motion vector's reference picture (850): the decoder sets the respective motion vector in the List 1 as the motion shift vector (855), and forgoes examining subsequent motion vectors in the List 1 (860). That is to say, the first matching motion vector in the List 1 will be used as the motion shift vector. In accordance with a determination that no respective motion vector in the List 1 uses the co-located picture as the respective motion vector's reference picture (865), the decoder sets the motion shift vector to be a zero-value vector (870). As a result, the corresponding coding unit and the current coding unit are in the same relative position with respect to the co-located picture and the current picture (e.g., no shift in motion between the current coding unit and the corresponding coding unit).

Finally, the decoder reconstructs a sub-block-based temporal motion vector for a respective sub-block of a plurality of sub-blocks in the current coding unit from a corresponding sub-block in the co-located picture based on the motion shift vector (875). For example, refer to FIG. 6D, sub-block temporal motion vector predictor 632 is constructed by using the motion shift vector 630 to locate the corresponding sub-block temporal motion vector 631 after scaling (e.g., the scaling process described with respect to FIG. 6A and the related description). In some embodiments, a sub-block includes one or two temporal motion vectors, from the List 0 and the List 1.

In some embodiments, the reconstructing the sub-block-based temporal motion vector for the respective sub-block of the plurality of sub-blocks in the current coding unit from the corresponding sub-block in the co-located picture based on the motion shift vector includes predicting sub-block-based temporal motion vectors for a respective sub-block of a plurality of sub-blocks in the current coding unit, including: searching, within a predefined area (e.g., valid area) in the co-located picture, a co-located sub-block corresponding to the respective sub-block based on the motion shift vector; in accordance with a determination that the co-located sub-block exists within the predefined area in the co-located picture: identifying one or two motion vectors of the co-located sub-block; and setting the sub-block-based temporal motion vectors for the respective sub-block as the one or two motion vectors scaled based on a first picture order count (POC) distance (e.g., POC distance tb in FIG. 6A) between the current picture and a reference picture of the current picture, and a second POC distance (e.g., POD distance td in FIG. 6A) between the co-located picture and a reference picture of the co-located picture. In some embodiments, in accordance with a determination that the co-located sub-block does not exist within the predefined area in the co-located picture, the sub-block-based temporal motion vectors for the corresponding sub-block are set to be zero-value motion vectors. In some other embodiments, in accordance with a determination that the co-located sub-block does not exist within the predefined area in the co-located picture, an alternative sub-block within the predefined area in the collocated picture is set as the corresponding sub-block. For example, the alternative sub-block is the boundary sub-block within the predefined area that is closest to the co-located sub-block.

In some embodiments, the predefined area has a size equal to the maximum allowable CTU size plus one column, regardless of the size of the CTU including the co-located coding unit.

In some embodiments, the decoder checks the motion vectors in the List 1 of the spatial neighbor block first before checking the List 0.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

According to the present disclosure, a method of decoding a current coding unit in a current picture comprises: determining a co-located picture for the current picture; determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and reconstructing a sub-block-based temporal motion vector for the respective sub-block of the plurality of sub-blocks in the current coding unit from the corresponding sub-block in the co-located picture based on the motion shift vector.

According to an embodiment of the present disclosure, the determining the motion shift vector for the current coding unit according to the motion vector of the spatial neighbor block of the current coding unit comprises: in accordance with a determination that a motion vector related to a first reference picture list for the spatial neighbor block uses the co-located picture as a reference picture for the motion vector related to the first reference picture list, setting the motion vector related to the first reference picture list as the motion shift vector; or in accordance with a determination that a motion vector related to the first reference picture list does not use the co-located picture as a reference picture for the motion vector related to the first reference picture list: in accordance with a determination that a motion vector related to a second reference picture list for the spatial neighbor block uses the co-located picture as a reference picture for the motion vector related to the second reference picture list, setting the motion vector related to the second reference picture list as the motion shift vector; or in accordance with a determination that a motion vector related to the second reference picture list for the spatial neighbor block does not use the co-located picture as a reference picture for the motion vector related to the second reference picture list, setting the motion shift vector to be a zero-value vector.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: determining, within a predefined area in the co-located picture, a co-located sub-block corresponding to the respective sub-block based on the motion shift vector; and setting the sub-block-based temporal motion vector for the respective sub-block as one or two scaled motion vectors derived based on one or two motion vectors of the co-located sub-block, a first picture order count (POC) distance between the current picture and a reference picture of the current picture, and a second POC distance between the co-located picture and a reference picture of the co-located picture.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: determining whether the co-located sub-block is within a predefined area in the co-located picture.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: in accordance with a determination that the co-located sub-block does not exist within the predefined area in the co-located picture: setting the sub-block-based temporal motion vectors for the corresponding sub-block to be zero-value motion vectors.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: in accordance with a determination that the co-located sub-block does not exist within the predefined area in the co-located picture: setting an alternative sub-block within the predefined area in the collocated picture as the corresponding sub-block, wherein the alternative sub-block is the boundary sub-block within the predefined area that is closest to the co-located sub-block.

According to an embodiment of the present disclosure, the spatial neighbor block of the current coding unit is a coding unit or a sub-block of a coding unit.

According to an embodiment of the present disclosure, the predefined area has a size equal to maximum allowable CTU size plus one column, regardless of a size of an CTU including the co-located sub-block.

According to an embodiment of the present disclosure, the maximum allowable CTU size is 128×128.

According to the present disclosure, a computing device comprises: one or more processors; memory coupled to the one or more processors; and a plurality of programs stored in the memory that, when executed by the one or more processors, cause the computing device to perform operations comprising: determining a co-located picture for the current picture; determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and reconstructing a sub-block-based temporal motion vector for the respective sub-block of the plurality of sub-blocks in the current coding unit from the corresponding sub-block in the co-located picture based on the motion shift vector.

According to an embodiment of the present disclosure, the determining the motion shift vector for the current coding unit according to the motion vector of the spatial neighbor block of the current coding unit comprises: in accordance with a determination that a motion vector related to a first reference picture list for the spatial neighbor block uses the co-located picture as a reference picture for the motion vector related to the first reference picture list, setting the motion vector related to the first reference picture list as the motion shift vector; or in accordance with a determination that a motion vector related to the first reference picture list does not use the co-located picture as a reference picture for the motion vector related to the first reference picture list: in accordance with a determination that a motion vector related to a second reference picture list for the spatial neighbor block uses the co-located picture as a reference picture for the motion vector related to the second reference picture list, setting the motion vector related to the second reference picture list as the motion shift vector; or in accordance with a determination that a motion vector related to the second reference picture list for the spatial neighbor block does not use the co-located picture as a reference picture for the motion vector related to the second reference picture list, setting the motion shift vector to be a zero-value vector.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: determining, within a predefined area in the co-located picture, a co-located sub-block corresponding to the respective sub-block based on the motion shift vector; and setting the sub-block-based temporal motion vector for the respective sub-block as one or two scaled motion vectors derived based on one or two motion vectors of the co-located sub-block, a first picture order count (POC) distance between the current picture and a reference picture of the current picture, and a second POC distance between the co-located picture and a reference picture of the co-located picture.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: determining whether the co-located sub-block is within a predefined area in the co-located picture.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: in accordance with a determination that the co-located sub-block does not exist within the predefined area in the co-located picture: setting the sub-block-based temporal motion vectors for the corresponding sub-block to be zero-value motion vectors.

According to an embodiment of the present disclosure, the reconstructing the sub-block-based temporal motion vector for the respective sub-block of the plurality of sub-blocks in the current coding unit from the corresponding sub-block in the co-located picture based on the motion shift vector comprises: in accordance with a determination that the co-located sub-block does not exist within the predefined area in the co-located picture: setting an alternative sub-block within the predefined area in the collocated picture as the corresponding sub-block, wherein the alternative sub-block is the boundary sub-block within the predefined area that is closest to the co-located sub-block.

According to an embodiment of the present disclosure, the spatial neighbor block of the current coding unit is a coding unit or a sub-block of a coding unit.

According to an embodiment of the present disclosure, the predefined area has a size equal to maximum allowable CTU size plus one column, regardless of a size of an CTU including the co-located sub-block.

According to an embodiment of the present disclosure, the maximum allowable CTU size is 128×128.

According to the present disclosure, a non-transitory computer readable storage medium stores a plurality of programs for execution by a computing device having one or more processors. And the plurality of programs, when executed by the one or more processors, cause the computing device to perform operations comprising: determining a co-located picture for the current picture; determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and reconstructing a sub-block-based temporal motion vector for the respective sub-block of the plurality of sub-blocks in the current coding unit from the corresponding sub-block in the co-located picture based on the motion shift vector.

According to an embodiment of the present disclosure, the determining the motion shift vector for the current coding unit according to the motion vector of the spatial neighbor block of the current coding unit comprises: in accordance with a determination that a motion vector related to a first reference picture list for the spatial neighbor block uses the co-located picture as a reference picture for the motion vector related to the first reference picture list, setting the motion vector related to the first reference picture list as the motion shift vector; or in accordance with a determination that a motion vector related to the first reference picture list does not use the co-located picture as a reference picture for the motion vector related to the first reference picture list: in accordance with a determination that a motion vector related to a second reference picture list for the spatial neighbor block uses the co-located picture as a reference picture for the motion vector related to the second reference picture list, setting the motion vector related to the second reference picture list as the motion shift vector; or in accordance with a determination that a motion vector related to the second reference picture list for the spatial neighbor block does not use the co-located picture as a reference picture for the motion vector related to the second reference picture list, setting the motion shift vector to be a zero-value vector.

What is claimed is:

1. A method of decoding a current coding unit in a current picture, the method comprising:
   determining a co-located picture for the current picture;
   determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and
   reconstructing a sub-block-based temporal motion vector for the respective sub-block of the plurality of sub-blocks in the current coding unit from the corresponding sub-block in the co-located picture based on the motion shift vector;
   wherein determining the motion shift vector for the current coding unit according to the motion vector of the spatial neighbor block of the current coding unit comprises:
   in accordance with a determination that a motion vector related to a first reference picture list for the spatial neighbor block does not use the co-located picture as a reference picture for the motion vector related to the first reference picture list:
   in accordance with a determination that a motion vector related to a second reference picture list for the spatial neighbor block uses the co-located picture as a reference picture for the motion vector related to the second reference picture list regardless of picture order counts of the current picture and the reference picture, setting the motion vector related to the second reference picture list as the motion shift vector; or in accordance with a determination that the motion vector related to the second reference picture list for the spatial neighbor block does not use the co-located picture as a reference picture for the motion vector related to the second reference picture list, setting the motion shift vector to be a zero-value vector, wherein the first reference picture list is List 0 of reference picture lists for the spatial neighbor block, and the second reference picture list is List 1 of the reference picture lists for the spatial neighbor block.

2. The method according to claim 1, wherein determining the motion shift vector for the current coding unit according to the motion vector of the spatial neighbor block of the current coding unit further comprises:

in accordance with a determination that the motion vector related to the first reference picture list for the spatial neighbor block uses the co-located picture as the reference picture for the motion vector related to the first reference picture list regardless of picture order counts of the current picture and the reference picture, setting the motion vector related to the first reference picture list as the motion shift vector.

3. The method of claim 1, wherein the reconstructing the sub-block-based temporal motion vector for the respective sub-block of the plurality of sub-blocks in the current coding unit from the corresponding sub-block in the co-located picture based on the motion shift vector comprises:

determining, within a predefined area in the co-located picture, a co-located sub-block corresponding to the respective sub-block based on the motion shift vector; and setting the sub-block-based temporal motion vector for the respective sub-block as one or two scaled motion vectors derived based on one or two motion vectors of the co-located sub-block, a first picture order count (POC) distance between the current picture and a reference picture of the current picture, and a second POC distance between the co-located picture and a reference picture of the co-located picture.

4. The method of claim 1, wherein the reconstructing the sub-block-based temporal motion vector for the respective sub-block of the plurality of sub-blocks in the current coding unit from the corresponding sub-block in the co-located picture based on the motion shift vector comprises: determining whether the co-located sub-block is within a predefined area in the co-located picture.

5. The method of claim 4, wherein the reconstructing the sub-block-based temporal motion vector for the respective sub-block of the plurality of sub-blocks in the current coding unit from the corresponding sub-block in the co-located picture based on the motion shift vector comprises:

in accordance with a determination that the co-located sub-block does not exist within the predefined area in the co-located picture:

setting the sub-block-based temporal motion vectors for the corresponding sub-block to be zero-value motion vectors.

6. The method of claim 4, wherein the reconstructing the sub-block-based temporal motion vector for the respective sub-block of the plurality of sub-blocks in the current coding unit from the corresponding sub-block in the co-located picture based on the motion shift vector comprises:

in accordance with a determination that the co-located sub-block does not exist within the predefined area in the co-located picture:

setting an alternative sub-block within the predefined area in the collocated picture as the corresponding sub-block, wherein the alternative sub-block is the boundary sub-block within the predefined area that is closest to the co-located sub-block.

7. The method of claim 1, wherein the spatial neighbor block of the current coding unit is a coding unit or a sub-block of a coding unit.

8. The method of claim 3, wherein the predefined area has a size equal to maximum allowable CTU size plus one column, regardless of a size of an CTU including the co-located sub-block.

9. The method of claim 8, wherein the maximum allowable CTU size is 128×128.

10. A computing device comprising:
one or more processors;
memory coupled to the one or more processors; and
a plurality of programs stored in the memory that, when executed by the one or more processors, cause the computing device to perform operations comprising:
determining a co-located picture for the current picture;
determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and
reconstructing a sub-block-based temporal motion vector for the respective sub-block of the plurality of sub-blocks in the current coding unit from the corresponding sub-block in the co-located picture based on the motion shift vector;
wherein determining the motion shift vector for the current coding unit according to the motion vector of the spatial neighbor block of the current coding unit comprises:
in accordance with a determination that a motion vector related to a first reference picture list for the spatial neighbor block does not use the co-located picture as a reference picture for the motion vector related to the first reference picture list:
in accordance with a determination that a motion vector related to a second reference picture list for the spatial neighbor block uses the co-located picture as a reference picture for the motion vector related to the second reference picture list regardless of picture order counts of the current picture and the reference picture, setting the motion vector related to the second reference picture list as the motion shift vector; or
in accordance with a determination that the motion vector related to the second reference picture list for the spatial neighbor block does not use the co-located picture as a reference picture for the motion vector related to the second reference picture list, setting the motion shift vector to be a zero-value vector,
wherein the first reference picture list is List 0 of reference picture lists for the spatial neighbor block, and the second reference picture list is List 1 of the reference picture lists for the spatial neighbor block.

11. The computing device according to claim 10, wherein the determining the motion shift vector for the current coding unit according to the motion vector of the spatial neighbor block of the current coding unit further comprises:

in accordance with a determination that the motion vector related to the first reference picture list for the spatial neighbor block uses the co-located picture as the reference picture for the motion vector related to the first reference picture list regardless of picture order counts of the current picture and the reference picture, setting the motion vector related to the first reference picture list as the motion shift vector.

12. The computing device of claim 10, wherein the reconstructing the sub-block-based temporal motion vector for the respective sub-block of the plurality of sub-blocks in the current coding unit from the corresponding sub-block in the co-located picture based on the motion shift vector comprises:
   determining, within a predefined area in the co-located picture, a co-located sub-block corresponding to the respective sub-block based on the motion shift vector; and
   setting the sub-block-based temporal motion vector for the respective sub-block as one or two scaled motion vectors derived based on one or two motion vectors of the co-located sub-block, a first picture order count (POC) distance between the current picture and a reference picture of the current picture, and a second POC distance between the co-located picture and a reference picture of the co-located picture.

13. The computing device of claim 10, wherein the reconstructing the sub-block-based temporal motion vector for the respective sub-block of the plurality of sub-blocks in the current coding unit from the corresponding sub-block in the co-located picture based on the motion shift vector comprises: determining whether the co-located sub-block is within a predefined area in the co-located picture.

14. The computing device of claim 13, wherein the reconstructing the sub-block-based temporal motion vector for the respective sub-block of the plurality of sub-blocks in the current coding unit from the corresponding sub-block in the co-located picture based on the motion shift vector comprises:
   in accordance with a determination that the co-located sub-block does not exist within the predefined area in the co-located picture:
      setting the sub-block-based temporal motion vectors for the corresponding sub-block to be zero-value motion vectors.

15. The computing device of claim 13, wherein the reconstructing the sub-block-based temporal motion vector for the respective sub-block of the plurality of sub-blocks in the current coding unit from the corresponding sub-block in the co-located picture based on the motion shift vector comprises:
   in accordance with a determination that the co-located sub-block does not exist within the predefined area in the co-located picture:
      setting an alternative sub-block within the predefined area in the collocated picture as the corresponding sub-block, wherein the alternative sub-block is the boundary sub-block within the predefined area that is closest to the co-located sub-block.

16. The computing device of claim 10, wherein the spatial neighbor block of the current coding unit is a coding unit or a sub-block of a coding unit.

17. The computing device of claim 12, wherein the predefined area has a size equal to maximum allowable CTU size plus one column, regardless of a size of an CTU including the co-located sub-block.

18. The computing device of claim 17, wherein the maximum allowable CTU size is 128×128.

19. A non-transitory computer readable storage medium storing a plurality of programs for execution by a computing device having one or more processors, wherein the plurality of programs, when executed by the one or more processors, cause the computing device to perform operations comprising:
   determining a co-located picture for the current picture;
   determining a motion shift vector for the current coding unit according to a motion vector of a spatial neighbor block of the current coding unit, wherein the motion shift vector indicates a shift in spatial position between a respective sub-block of a plurality of sub-blocks in the current coding unit in the current picture and a corresponding sub-block in the co-located picture; and
   reconstructing a sub-block-based temporal motion vector for the respective sub-block of the plurality of sub-blocks in the current coding unit from the corresponding sub-block in the co-located picture based on the motion shift vector;
   wherein determining the motion shift vector for the current coding unit according to the motion vector of the spatial neighbor block of the current coding unit comprises:
   in accordance with a determination that a motion vector related to a first reference picture list for the spatial neighbor block does not use the co-located picture as a reference picture for the motion vector related to the first reference picture list:
   in accordance with a determination that a motion vector related to a second reference picture list for the spatial neighbor block uses the co-located picture as a reference picture for the motion vector related to the second reference picture list regardless of picture order counts of the current picture and the reference picture, setting the motion vector related to the second reference picture list as the motion shift vector; or
   in accordance with a determination that the motion vector related to the second reference picture list for the spatial neighbor block does not use the co-located picture as a reference picture for the motion vector related to the second reference picture list, setting the motion shift vector to be a zero-value vector,
   wherein the first reference picture list is List 0 of reference picture lists for the spatial neighbor block, and the second reference picture list is List 1 of the reference picture lists for the spatial neighbor block.

20. The non-transitory computer readable storage medium according to claim 19, wherein the determining the motion shift vector for the current coding unit according to the motion vector of the spatial neighbor block of the current coding unit further comprises:
   in accordance with a determination that the motion vector related to the first reference picture list for the spatial neighbor block uses the co-located picture as the reference picture for the motion vector related to the first reference picture list regardless of picture order counts of the current picture and the reference picture, setting the motion vector related to the first reference picture list as the motion shift vector.

* * * * *